(12) United States Patent
Takada et al.

(10) Patent No.: US 6,454,403 B1
(45) Date of Patent: Sep. 24, 2002

(54) INK SET FOR COLOR INK-JET RECORDING, AND RECORDING METHOD, RECORDING APPARATUS, INK CARTRIDGE, RECORDING UNIT AND REDUCTION OF BLEEDING, EMPLOYING THE INK SET

(75) Inventors: Yoichi Takada, Yokohama; Yoshihisa Takizawa, Machida; Hisashi Teraoka, Odawara; Yuko Yakushigawa, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/675,216

(22) Filed: Sep. 29, 2000

(30) Foreign Application Priority Data

Sep. 30, 1999 (JP) ............................. 11-280108
Sep. 30, 1999 (JP) ............................. 11-280109

(51) Int. Cl.[7] .............................................. G01D 11/00
(52) U.S. Cl. ......................................... 347/100; 347/96
(58) Field of Search ................ 347/100, 96; 106/31.58, 106/31.43

(56) References Cited

U.S. PATENT DOCUMENTS

| | | | |
|---|---|---|---|
| 4,313,124 A | 1/1982 | Hara | 346/140 R |
| 4,345,262 A | 8/1982 | Shirato et al. | 346/140 R |
| 4,459,600 A | 7/1984 | Sato et al. | 346/140 R |
| 4,463,359 A | 7/1984 | Ayata et al. | 346/1.1 |
| 4,558,333 A | 12/1985 | Sugitani et al. | 346/140 R |
| 4,723,129 A | 2/1988 | Endo et al. | 346/1.1 |
| 4,740,796 A | 4/1988 | Endo et al. | 346/1.1 |
| 5,184,148 A | 2/1993 | Suga et al. | 346/1.1 |
| 5,198,023 A | 3/1993 | Stoffel | 106/22 R |
| 5,320,668 A | 6/1994 | Shields et al. | 106/20 R |
| 5,555,008 A | 9/1996 | Stoffel et al. | 347/100 |

FOREIGN PATENT DOCUMENTS

| | | | | |
|---|---|---|---|---|
| EP | 838507 | 4/1998 | | |
| EP | 867485 | 9/1998 | | |
| EP | 0867485 A2 | * 9/1998 | ............. | B41J/2/01 |
| EP | 879857 | 11/1998 | | |
| EP | 0879857 A2 | * 11/1998 | ............. | B41J/2/01 |
| EP | 943666 | 9/1999 | | |
| JP | 54-56847 | 5/1979 | | |
| JP | 59-123670 | 7/1984 | | |
| JP | 59-138461 | 8/1984 | | |
| JP | 60-71260 | 4/1985 | | |
| JP | 3-134073 | 6/1991 | | |
| JP | 3-210373 | 9/1991 | | |
| JP | 6-57192 | 3/1994 | | |
| JP | 7-1837 | 1/1995 | | |
| JP | 7-145336 | 6/1995 | | |
| JP | 2783647 | 5/1998 | | |
| JP | 10-183046 | 7/1998 | | |

* cited by examiner

*Primary Examiner*—John Barlow
*Assistant Examiner*—Manish S. Shah
(74) *Attorney, Agent, or Firm*—Fitzpatrick, Cella, Harper & Scinto

(57) ABSTRACT

An ink set for recording a color image with inks of two or more colors including at least one black ink and one color ink on a recording medium is provided. The ink set includes a black ink containing a self-dispersible carbon black having at least one cationic group bonded directly or through another atomic group to the surface thereof, and a color ink containing an anionic substance and having a buffering capability against a pH change. The ink set satisfies the requirements for print quality, image durability, and so forth and does not cause bleeding between a black ink-printed area and a color ink-printed area.

25 Claims, 15 Drawing Sheets

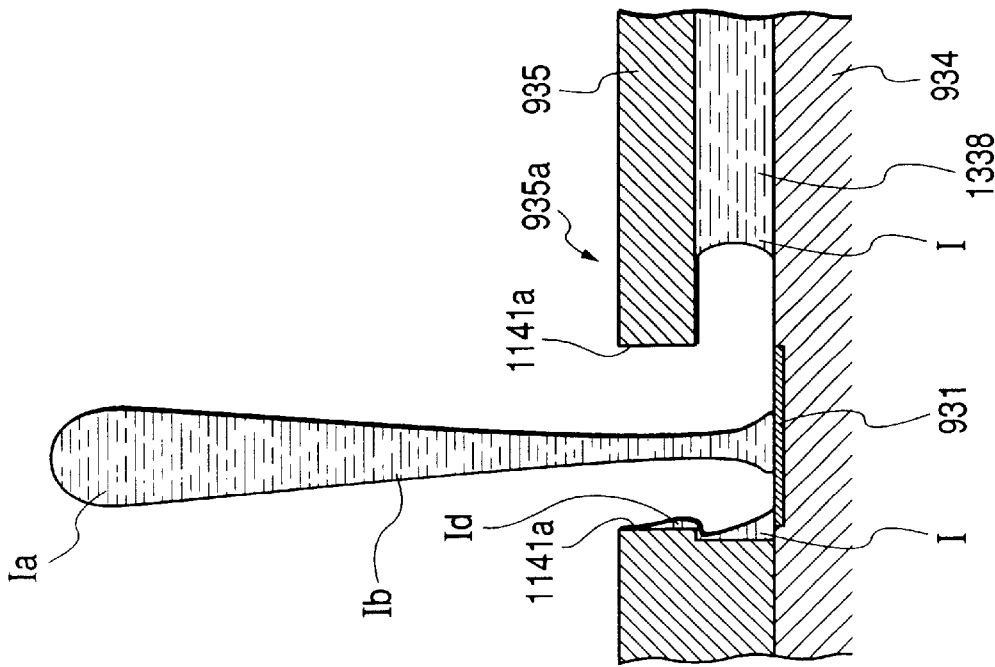
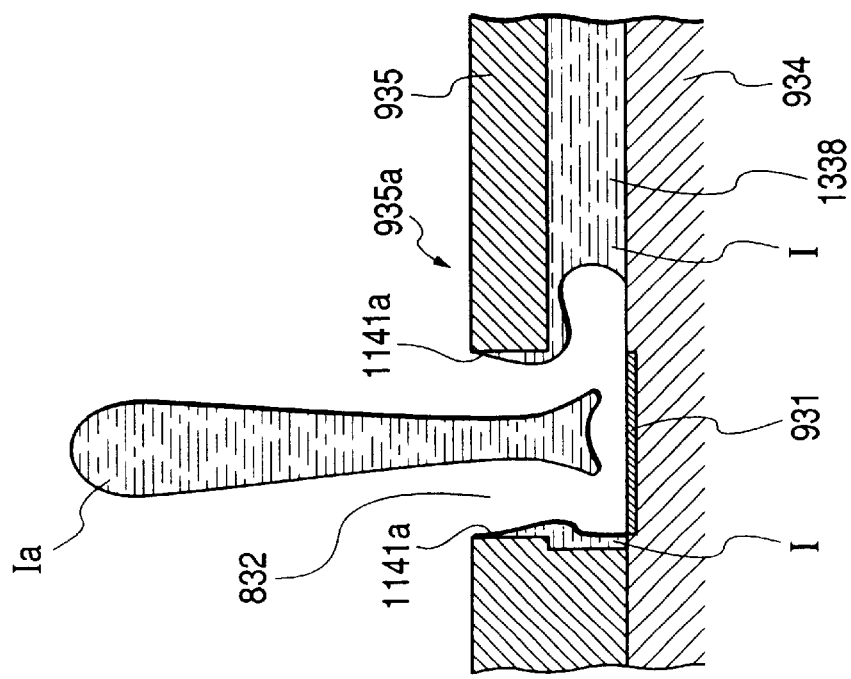

INK SET FOR COLOR INK-JET RECORDING, AND RECORDING METHOD, RECORDING APPARATUS, INK CARTRIDGE, RECORDING UNIT AND REDUCTION OF BLEEDING, EMPLOYING THE INK SET

BACKGROUND OF THE INVENTION

1. Field of the Invention

The present invention relates to a color-ink set of plural color inks including a black ink, for use in recording of a color image on a recording medium in combination with the plural color inks. The present invention also relates to an ink-jet recording method and an ink-jet apparatus employing the ink set. The present invention particularly relates to a color ink set, and an ink-jet recording method and an ink-jet apparatus employing the ink set for forming an image on plain paper with sufficient image density, sufficient sharpness, and high quality of the image with improvement in the water resistance and lightfastness of the print.

2. Related Background Art

In ink-jet recording, for formation of a black image, various black inks employing a pigment are disclosed which can achieve formation of a black image on plain paper with high image density, high print quality, and high durability. Furthermore, ink sets are disclosed which does not cause bleeding at the boundary between a black print area and a color print area in the printed portion. This phenomenon is hereinafter referred to simply as "bleeding". Ink-jet recording methods and apparatuses therefor are also disclosed.

As to the ink, Japanese Patent Application Laid-Open No. 3-210373 discloses a black ink comprising an acidic carbon black and an alkali-soluble polymer. Japanese Patent Application Laid-Open No. 3-134073 discloses an ink-jet recording ink which gives a dispersion excellent in storage stability and having excellent ink ejection properties in ink-jet recording.

As to the ink set, Japanese Patent Application Laid-Open No. 6-57192 discloses an ink set for ink-jet recording which comprises a black ink containing at least one anionic dye, and a yellow ink containing at least one cationic dye and one multivalent precipitant, and can prevent bleeding. Japanese Patent Application Laid-Open No. 7-145336 discloses an ink set which causes less bleeding in multi-color printing by employing an anionic ink and a cationic ink, at least one of the inks containing a polymer having ionic properties of the ink, and by bringing into contact the anionic ink and the cationic ink in the presence of the polymer.

As to the ink-jet printing method and the ink set, Japanese Patent Application Laid-Open No. 7-1837 discloses an ink-jet recording method causing less bleeding by employing a black ink containing a coloring agent comprising a pigment and a dispersant which is insolubilized at a specified pH, and a color ink having a pH for insolubilizing the dispersant, and also discloses an ink set therefor. Japanese Patent Application Laid-Open No. 10-183046 discloses an ink-jet printing method employing a black ink containing a coloring material of a carbon black having a cationic group on the surface, and a color ink containing an anionic dye as the colorant, and also discloses an ink set therefor.

For the ink disclosed in the aforementioned Japanese Patent Application Laid-Open No. 3-210373 which comprises an acidic carbon black and an alkali-soluble polymer, the carbon black is dispersed by the alkali-soluble polymer. However, this dispersion has a high viscosity, which causes problems in the storage stability. The ink disclosed in the aforementioned Japanese Patent Application Laid-Open No. 3-134073 can gives a dispersion which has sufficient storage stability as well as excellent ejecting properties for a bubble jet recording apparatus. However, this ink is liable to be insufficient in print density.

The ink set disclosed in the aforementioned Japanese Patent Application Laid-Open No. 6-57192, which comprises a black ink containing an anionic dye as a colorant and a yellow ink containing a cationic dye and a multivalent precipitant, cannot satisfy all of the print density, print quality, image durability of the black ink simultaneously, and does not give the desired color developability of the yellow ink, although the ink set reduces the bleeding significantly.

The ink set disclosed in the aforementioned Japanese Patent Application Laid-Open No. 7-145336, which can reduce the bleeding by employing an anionic ink and a cationic ink and bringing into contact the anionic ink and the cationic ink in the presence of the polymer in multi-color printing, but can cause adverse effects on ink reliability depending on the type of the polymer. In particular, when an ink ejection from one nozzle is suspended for a certain time period (e.g., one minute) during printing, a subsequent ink ejection through the nozzle sometimes becomes unstable to cause irregularity in the print. Such unstable subsequent ink ejection is called "first droplet ejection failure", and the stability of intermittent ejection is called "first ejection stability" in the specification of the present invention.

For the ink set disclosed in the aforementioned Japanese Patent Application Laid-Open No. 7-1837 which employs a black ink containing a coloring agent comprising a pigment and a dispersant insoluble at a specific pH, and a color ink having a pH for insolubilizing the dispersant. This ink set is limited in selection of the dye owing to the required acidity (pH) of the color ink in consideration of the other properties required for the color ink. This Laid-Open publication does not describe the polarity of the coloring material.

The ink set disclosed in the aforementioned Japanese Patent Application Laid-Open No. 10-183046, which employs a black ink containing a coloring material of a carbon black having a cationic group on the surface and a color ink containing an anionic dye as the colorant, does not sufficiently reduce the bleeding, although this ink set is satisfactory in the print density, print quality, image durability, and other properties.

SUMMARY OF THE INVENTION

An object of the present invention is to provide an ink set which forms an image satisfying the required properties of the black ink such as print quality, and image durability with more effective alleviation of the bleeding at the boundary between a black area and a non-black color area of an image formed on a recording medium.

Another object of the present invention is to provide an ink-jet recording method which forms a recorded image of high quality with effective reduction of the bleeding at the boundary between a black area and a non-black color area of an image formed on a recording medium.

Still another object of the present invention is to provide an ink-jet recording apparatus which forms a recorded image of high quality with effective reduction of the bleeding at the boundary between a black area and a non-black color area of an image formed on a recording medium.

A further object of the present invention is to provide a recording unit which can be used for the above ink-jet recording apparatus.

A still further object of the present invention is to provide an ink cartridge for forming an image with high quality with less bleeding.

A still further object of the present invention is to provide a method for reliably reducing the bleeding at the boundary between a black image area and a colored image area.

In one embodiment of the present invention, there is provided an ink set for recording a color image with inks of two or more colors comprising at least one black ink and one color ink on a recording medium, the black ink containing a self-dispersible carbon black having at least one cationic group bonded directly or through another atomic group to the surface thereof, and the color ink containing an anionic substance and having a buffering capability against a pH change.

In another embodiment of the present invention, there is provided an ink-jet recording method comprising the steps of:

applying a black ink containing a self-dispersible carbon black having a cationic group bonded directly or through another atomic group to the surface thereof onto a recording medium by ejecting the black ink through an orifice in response to a recording signal; and applying a color ink containing an anionic substance and having a buffering capability against a pH change onto the recording medium by ejecting the color ink through an orifice in response to another recording signal.

In still another embodiment of the present invention, there is provided a recording unit comprising a black ink holder holding a black ink containing a self-dispersible carbon black having a cationic group bonded directly or through another atomic group to the surface thereof; a color ink holder for holding a color ink containing an anionic substance and having a buffering capability against a pH change; and a head for ejecting the black ink and the color ink respectively.

In still another embodiment of the present invention, there is provided an ink cartridge comprising a black ink holder holding a black ink containing a self-dispersible carbon black having a cationic group bonded directly or through another atomic group to the surface thereof; and a color ink holder holding a color ink containing an anionic substance and having a buffering capability against a pH change.

In still another embodiment of the present invention, there is provided an ink-jet recording apparatus comprising a black ink holder holding a black ink containing a self-dispersible carbon black having a cationic group bonded directly or through another atomic group to the surface thereof; a color ink holder holding a color ink containing an anionic substance and having a buffering capability against a pH change; and a head for ejecting the black ink and the color ink respectively.

In a further embodiment of the present invention, there is provided a method for alleviating bleeding at a boundary between a black color image and a color image each formed on a recording medium by ink-jet method comprising the steps of:

forming the black color image by using a black ink containing a self-dispersible carbon black having a cationic group bonded directly or through another atomic group to the surface thereof; and forming the color image by using a color ink containing an anionic substance and having a buffering capability against a pH change.

BRIEF DESCRIPTION OF THE DRAWINGS

FIG. 21 is a schematic sectional view for explaining the process of the liquid ejection through the liquid-ejection head with the lapse of time corresponding to the sectional view at X—X in FIG. 16 in combination with FIGS. 17 to 20 and FIGS. 22 to 24.

FIG. 22 is a schematic sectional view for explaining the process of the liquid ejection through the liquid-ejection head with the lapse of time corresponding to the sectional view at X—X in FIG. 16 in combination with FIGS. 17 to 21 and FIGS. 23 and 24.

DETAILED DESCRIPTION OF THE PREFERRED EMBODIMENTS

Figure 1:
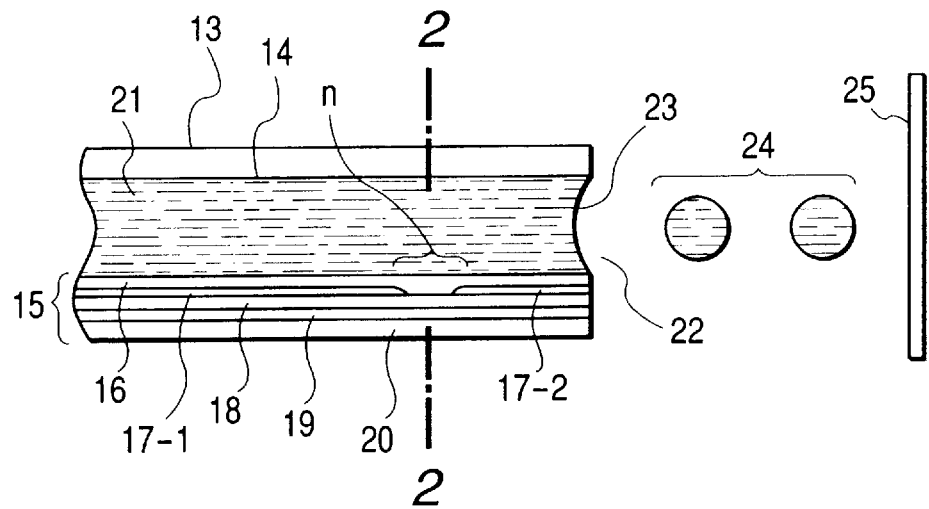
FIG. 1 is a sectional view of a head of an ink-jet recording apparatus along an ink flow path.

Preferred embodiments of the present invention are described below in detail.

For the black ink for ink-jet recording, a pigment ink containing a pigment as a colorant is preferred to a dye ink for achieving high image density and image durability, as described before. However, in the pigment ink, a dispersant has to be added for dispersing the pigment in a desired state. In ink-jet recording with a pigment ink, the dispersant is liable to cause various disadvantages. For example, a polymer type dispersant contained in the ink is liable to make the face of the ejection head wettable, to cause clogging of the orifice, or to impair the storage stability of the ink. A surfactant type dispersant contained in the ink is liable to lower the image density, or to make the face of the ejection head face wettable.

On the other hand, the specified carbon black employed as a colorant for the black ink in the present invention is self-dispersible without a dispersant, not causing the above disadvantage of the dispersant. More specifically, the carbon black having a cationic group (more preferably a hydrophilic cationic group) bonded directly or through another atomic group to the surface thereof can keep the stable dispersion state by itself in an aqueous medium like water by the function of the hydrophilic group. Therefore, with this carbon black, the ink for ink-jet recording can be prepared without dispersants for dispersing the pigment.

The ink set of the present invention employs a color ink in combination with the black ink. The color ink contains an anionic substance, and has a function of buffering a change of a hydrogen ion concentration. Thereby, the bleeding is effectively alleviated at the boundary between the image printed with the black ink and the image printed with the color ink.

In this specification of the present invention, the phrase "buffering a change of a hydrogen ion concentration" signifies that the ink has a specified region in which the change of the hydrogen ion concentration is gradual. Specifically, when the ink has a pH region where addition of aqueous 1.5N sulfuric acid solution to 50 mL of the ink changes the pH of the ink by not more than 1.0, the ink is defined "to have a buffering capability."

As the results of the investigation made by the inventors of the present invention, it was found that the bleeding between the black ink and the color ink can be reduced effectively by incorporating an anionic substance (e.g., an anionic dye) into the color ink, and adjusting the color ink to have a buffering capability at a pH range higher than the pH of the black ink.

The effect of the ink set of the present invention having the constitution above is considered to be achieved by the reasons below.

When a black image and a color image are printed adjacently and the black ink and the color ink of the above constitution come into contact with each other on the recording medium, the carbon black in the black ink and the anionic substance (the anionic dye) in the color ink aggregate together. This aggregation immobilizes the carbon black of the black ink and the dye of the color ink on the recording medium to prevent effectively the bleeding.

In other words, when the self-dispersible carbon black of the black ink and the dye of the color ink are electrically neutralized stably on the recording medium, the dispersion state or the dissolution state of the colorants is completely broken. Immobilization of the colorants of the black ink and the color ink can inhibit penetration of the inks to the adjacent printed region on the recording medium to prevent the bleeding.

As the results of investigation by the inventors of the present invention, the electrical neutralization between the colorants constituting the respective inks is greatly affected by the pH at the boundary portion of the contact of the black ink with the color ink, so that the bleeding prevention effect is greatly affected by the pH at the boundary. That is, when the two inks are brought into contact at the pH in an acidic range, the electrical neutralization can be insufficient between the colorants, not breaking completely the dispersed state or the dissolved state, and rendering the reduction of the bleeding insufficient. Therefore, for preventing or reducing the bleeding, the pH at the boundary of the two contacting inks has to be kept at such a level as to cause sufficient electrical neutralization of the colorants to break the state of dispersion or dissolution.

Therefore, in the present invention, a buffering capability is imparted to the color ink for buffering the change of the hydrogen ion concentration on contact of the two inks on a recording medium so as to keep the pH to cause the complete break of the dispersion or dissolution state. The bleeding is thus prevented by the break of the dispersion or dissolution state.

The ink set of the present invention, as mentioned above, intends to reduce the bleeding between a black ink and a color ink, but does not take a special measure to prevent bleeding between different color inks. However, since the color inks are mostly used in image formation and graphic printing, the bleeding between color inks can be prevented by a known method such as imparting to the ink higher penetrativity to a sized paper sheet in preparation of the color ink, thereby significant deterioration of the print quality being avoided.

The ink set of the present invention comprises a black ink containing a coloring material of a self-dispersible carbon black having at least one cationic group bonded directly or through another atomic group to the surface thereof, and a color ink containing an anionic substance and having a buffering capability against a change of hydrogen ion concentration. Of the components, firstly the carbon black of self-dispersible type is explained.

(Self-Dispersible Carbon Black)

The ink set of the present invention employs, as a colorant, a black ink containing a self-dispersible carbon black having at least one cationic group bonded directly or through another atomic group to the surface thereof. Such a self-dispersible carbon black as the colorant can be dispersed stably without a dispersant in the aqueous medium of the ink.

The hydrophilic group bonded directly or through another atomic group to the surface of the carbon black in the present invention is preferably constituted of at least one aromatic group such as phenyl, benzyl, phenacyl, and naphthyl, or a heterocyclic group such as pyridyl; and at least one cationic group. More preferably, the cationic group is a quaternary ammonium group. A quaternary phosphonium may be employed in place of the quaternary ammonium.

The cationic group to be bonded to the surface of the carbon black preferably used in the present invention includes the hydrophilic groups shown below. However, the cationic group is not limited thereto in the present invention. In the chemical formulas below, R represents a linear or branched alkyl group of 1–12 carbons, a substituted or unsubstituted phenyl group, or a substituted or unsubstituted naphthyl group.

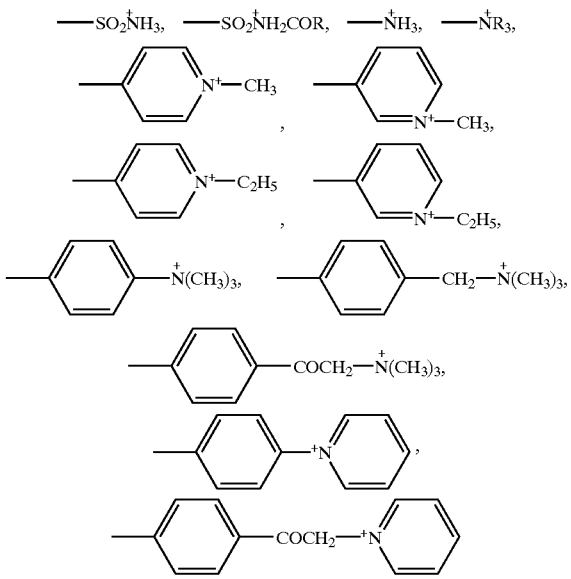

The content of the self-dispersible carbon black having the above cationic group on the surface in the ink ranges preferably from 0.05% to 15.0%, more preferably from 1.0% to 10.0% based on the total weight of the ink. In this range of the content, the reliability of the ink for ink-jet recording such as print density, and ejection stability is further improved.

(Colorant-Enclosing Resin)

Addition of a colorant-enclosing resin to the black ink improves the abrasion resistance and the marking-pen resistance without impairing the quality of the ink such as ink ejection properties. The resin enclosing the colorant (hereinafter referred to as a "colorant-enclosing resin") includes resins microencapsulating a water-insoluble colorant, and emulsified resins in which a water-insoluble colorant dissolved or dispersed in an oily solvent is dispersed in an aqueous medium. Particularly preferred are resins microencapsulating a colorant.

In the microencapsulation of the water-insoluble colorant such as oil-soluble dyes and pigments, for example, the colorant is considered to tend to interact with the hydrophobic moieties of the resin to prevent orientation of the hydrophobic moiety of the resin toward the aqueous system. Presumably, such an ink-jet ink containing the colorant-enclosing resin is prevented from adhesion or deposition onto a water-repelling nozzle face of an ink-jet head to improve the ink ejection stability for a long term.

The resin microencapsulating a colorant is a resin dispersion obtained by dissolving or dispersing a water-insoluble colorant or the like in an oily solvent and microencapsulating it by a known suitable process. The suitable colorant therefor includes water-insoluble colorants such as pigments and oil-soluble dyes. The water-insoluble colorant can readily be microencapsulated in a resin. Specifically, a carbon black or the like is used as a pigment of black (Bk).

The carbon black used for this purpose includes those produced by a furnace process, a channel process, or a like process, having preferably the properties: a primary particle diameter of 15–40 nm, a BET specific surface area of 50–300 m$^2$/g, a DBP absorptivity of 40–150 mL/100 g, a volatile matter content of 0.5–10%, a pH of 2–9, and so forth. The commercial products having such properties include No.2300, No.900, MCF88, No.33, No.40, No.45, No.52, MA7, MA8, and No.2200B (produced by Mitsubishi Chemical Co.); RAVEN1255 (Produced by Columbia Co.); REGAL400R, REGAL330R, REGAL660R, and MOGUL L (produced by Cabot Co.); and Color Black FW-1, Color Black FW18, Color Black S170, Color Black S150, Printex 35, and Printex U (produced by Degussa Co.).

The oil-soluble dye includes:

C.I. Solvent Yellow 1, 2, 3, 13, 19, 22, 29, 36, 37, 38, 39, 40, 43, 44, 45, 47, 62, 63, 71, 76, 81, 85, 86, etc.;

C.I. Solvent Red 8, 27, 35, 36, 37, 38, 39, 40, 58, 60, 65, 69, 81, 86, 89, 91, 92, 97, 99, 100, 109, 118, 119, 122, etc; and C.I. Solvent Blue 14, 24, 26, 34, 37, 38, 39, 42, 43, 45, 48, 52, 53, 55, 59, 67, etc.;

C.I. Solvent Black 3, 5, 7, 8, 14, 17, 19, 20, 22, 24, 26, 27, 28, 29, 43, 45, etc.

Further, various known water-soluble dyes are also usable therefor by replacing the counter ion (usually sodium ion, potassium ion, or ammonium ion) with an organic amine.

A suitable colorant is selected from the aforementioned colorants to adjust or complement the color tone, for example, of the aforementioned colorant for the black ink, thereby further improving the density of the recorded image. Since a carbon black is used as the colorant of the black ink, the colorant enclosed in the colorant-enclosing resin is preferably a carbon black. In such an embodiment, the respective colorants may be separately enclosed in the respective resins, or may be enclosed in a common resin.

The process for microencapsulation of the colorant in a resin is described below.

Firstly, the colorant is dissolved or dispersed in an oily solvent. Then the oily solvent containing the colorant dissolved or dispersed therein is dispersed and emulsified in water. The emulsification is conducted by ultrasonic dispersion or by agitating with a dispersion machine or a stirrer, optionally by addition of an additive such as an emulsifier, a dispersing agent, and a protective colloid as an emulsifying or dispersing auxiliary agent. The emulsifier or the dispersion auxiliary agent includes polymeric materials such as PVA, PVP, and a gum arabic; and anionic surfactants, and nonionic surfactants.

The above emulsified matter is microencapsulated. The process for microencapsulation thereof includes phase reversion emulsion process in which a colorant and a resin is dissolved in a water-insoluble organic solvent (oily solvent) and the phase is reversed to an aqueous phase; an interfacial polymerization process in which polymerization is caused at the interface between an organic phase and an aqueous phase to form a microcapsule; an in-situ polymerization process in which a wall-forming material is dissolved or supplied in only an organic phase only to form a microcapsule; a coacervation process in which the phase separation of a concentrated polymer phase is conducted by changing the pH, temperature, or concentration, and so forth. After formation of the microcapsule, the oily solvent is removed. The particulate resin enclosing the colorant, prepared as above, has an average particle diameter ranging preferably from 0.01 to 2.0 µm, more preferably from 0.05 to 1 µm.

The resin for enclosing the colorant as above preferably has a cationic hydrophilic group on the resin surface. Such a resin is preferably a copolymer of a hydrophilic monomer and a hydrophobic monomer, or a salt thereof. The hydrophilic monomer includes N,N-dimethylaminoethyl methacrylate [$CH_2=C(CH_3)—COO—C_2H_4N(CH_3)_2$], N,N-dimethylaminoethyl acrylate [$CH_2=CH—COO—C_2H_4N(CH_3)_2$], N,N-dimethylaminopropyl methacrylate [$CH_2=C(CH_3)—COO—C_3H_6N(CH_3)_2$], N,N-dimethylaminopropyl acrylate [$CH_2=CH—COO—C_3H_6N(CH_3)_2$], N,N-dimethyl acrylamide [$CH_2=CH—CON(CH_3)_2$], N,N-dimethyl methacrylamide [$CH_2=C(CH_3)—CON(CH_3)_2$], N,N-dimethylaminoethyl acrylamide [$CH_2=CH—CONHC_2H_4(CH_3)_2$], N,N-dimethylaminoethyl methacrylamide [$CH_2=C(CH_3)—CONHC_2H_4(CH_3)_2$], N,N-dimethylaminopropyl acrylamide [$CH_2=CH—CONH—C_3H_6N(CH_3)_2$], and N,N-dimethylaminopropyl methacrylamide [$CH_2=C(CH_3)—CONHC_3H_6(CH_3)_2$].

For forming the salt, hydrochloric acid, sulfuric acid, acetic acid, or a like acid is used for a tertiary amine; and methyl chloride, dimethyl sulfate, benzyl chloride, epichlorohydrin, or the like is used for quaternization.

The hydrophobic monomer includes styrene and its derivatives, vinyltoluene and its derivatives, vinylnaphthalene and its derivatives, butadiene and its derivatives, isoprene and its derivatives, ethylene and its derivatives, propylene and its derivatives, alkyl esters of acrylic acid, and alkyl esters of methacrylic acid.

The colorant-enclosing resin is contained in the ink at a content ranging preferably from 0.5% to 10.0%, more preferably from 1.0% to 7.0% based on the total weight of the ink, but the content is not limited thereto. Within the above content range, the reliability the ink-jet ink such as print density and ink ejection stability is further improved.

(Color Dyes)

The color ink used in the present invention comprises an anionic substance, and has a buffering capability against change of the hydrogen ion concentration. The colorant for the color ink may be a known dye or pigment. In consideration of the color developability, anionic dyes are preferred. The anionic dyes are generally useful, whether the dye is a known one or a newly synthesized one, provided that the dye gives a suitable color tone and a high image density. Two or more of the dye may be used in combination.

The specific examples of the anionic dyes usable in the present invention are shown below for the respective colors of the inks.

(Colorant for Yellow)

C.I.Direct Yellow 8, 11, 12, 27, 28, 33, 39, 44, 50, 58, 85, 86, 87, 88, 89, 98, 100, 110, and 132;
C.I. Acid Yellow 1, 3, 7, 11, 17, 23, 25, 29, 36, 38, 40, 42, 44, 76, 98, and 99;
C.I. Reactive Yellow 2, 3, 17, 25, 37, and 42;
C.I. Food Yellow 3

(Colorant for Magenta)

C.I. Direct Red 2, 4, 9, 11, 20, 23, 24, 31, 39, 46, 62, 75, 79, 80, 83, 89, 95, 197, 201, 218, 220, 224, 225, 226, 227, 228, 229, and 230;
C.I. Acid Red 6, 8, 9, 13, 14, 18, 26, 27, 32, 35, 42, 51, 52, 80, 83, 87, 89, 92, 106, 114, 115, 133, 134, 145, 158, 198, 249, 265, and 289;
C.I. Reactive Red 7, 12, 13, 15, 17, 20, 23, 24, 31, 42, 45, 46, and 59;
C.I. Food Red 87, 92, and 94

(Colorant for Cyan)

C.I. Direct Blue 1, 15, 22, 25, 41, 76, 77, 80, 86, 90, 98, 106, 108, 120, 158, 163, 168, 199, and 226;
C.I. Acid Blue 1, 7, 9, 15, 22, 23, 25, 29, 40, 43, 59, 62, 74, 78, 80, 90, 100, 102, 104, 117, 127, 138, 158, and 161;
C.I. Reactive Blue 4, 5, 7, 13, 14, 15, 18, 19, 21, 26, 27, 29, 32, 38, 40, 44, and 100

The colorant is contained in the ink at a content ranging preferably from 0.2% to 15%, more preferably from 0.5 to 10% based on the total weight of the ink. Within the above content range, the reliability of the ink-jet ink such as print density and ink ejection stability is further improved.

The aqueous medium for the color ink of the present invention includes water, and a mixture of water and a water-soluble organic solvent. Of the water-soluble organic solvents, particularly preferred are those which are capable of preventing drying of the ink.

The water-soluble organic solvent includes specifically alkyl alcohols of 1–4 carbons such as methyl alcohol, ethyl alcohol, n-propyl alcohol, isopropyl alcohol, n-butyl alcohol, sec-butyl alcohol, and t-butyl alcohol; amides such as dimethylformamide, and dimethyl acetamide; ketones and ketoalcohols such as acetone, and diacetone alcohol; ethers such as tetrahydrofuran, and dioxane; polyalkylene glycols such as polyethylene glycol, and polypropylene glycol; alkylene glycols having 2–6 carbons such as ethylene glycol, propylene glycol, butylene glycol, triethylene glycol, 1,2,6-hexanetriol, thiodiglycol, hexylene glycol, and diethylene glycol; lower alkyl ether acetates such as polyethylene glycol monomethyl ether acetate; glycerin; lower alkyl ethers of a polyhydric alcohol such as ethylene glycol monomethyl (or monoethyl) ether, diethylene glycol methyl (or ethyl) ether, and triethylene glycol monomethyl (or monoethyl) ether; polyhydric alcohols such as trimethylolpropane, and trimethylolethane; N-methyl-2-pyrrolidone, 2-pyrrolidone, and 1,3-dimethyl-2-imidazolidinone, and so forth.

The aqueous organic solvents as mentioned above may be used solely or a mixture of two or more thereof. The content of the water-soluble organic solvent in the ink of the present invention is not specially limited, ranging preferably from 3% to 50% by weight based on the total weight of the ink. The content of water in the ink ranges preferably from 50% to 95% by weight based on the total weight of the ink.

The aforementioned color inks are usable for writing utensils and ink-jet recording inks. The ink-jet recording system includes a recording system applying mechanical energy to the ink to eject ink-droplets and another recording system applying thermal energy to the ink to cause bubbling to eject ink droplets. The ink of the present invention is particularly suitable for the ink-jet recording systems. For ink-jet recording, the aforementioned color ink preferably has properties suitable for ejection through an ink-jet head. For ejection through the ink-jet head, the ink has a viscosity ranging preferably from 1 to 15 cP and a surface tension of preferably not lower than 25 mN/m (dyn/cm), more preferably a viscosity ranging from 1 to 5 cP; and a surface tension ranging from 25 to 50 mN/m (dyn/cm).

The aqueous medium for imparting the aforementioned desirable properties to the color inks employed in the present invention preferably contains one of glycerin, trimethylolpropane, thioglycol, ethylene glycol, diethylene glycol, isopropyl alcohol, and acetylene alcohol. The acetylene alcohol includes that represented by the following fomula.

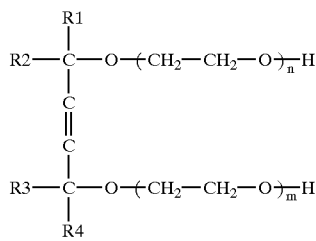

where R1, R2, R3, and R4 each are respectively an alkyl group, specifically a linear or branched alkyl group of 1–4 carbons; m and n each are respectively an integer, and m=0 and n=0, or $1 \leq m+n \leq 30$, and when m+n=1, one of m and n is 0.

To the color ink employed in the present invention, a buffering capability is imparted for buffering the hydrogen ion concentration by a known method of buffer solution preparation. Thereby, the pH change of the color ink upon addition of 1.5 mL of aqueous 1N sulfuric acid to 50 mL of the color ink is buffered to be not more than 1.0.

Specifically, a buffering agent to be added to the color ink includes ammonium salts of organic acids and inorganic acids, amine salts of organic acids and inorganic acids, alkali metal hydroxides, ammonia, basic amines, basic amino acids, sodium dihydorgenphosphate, glycine, sodium chloride, sodium tetraborate, sodium carbonate, sodium hydrogencarbonate, hydrochloric acid, sodium dimethylglycinate, boric acid, alkali metal chlorides, polyamines, and polyimines, and a combination of two or more thereof. More specifically, the buffering agent includes sodium dihydrogenphospate/sodium hydroxide, glycine+ sodium chloride/sodium hydroxide, sodium tetraborate/ sodium hydroxide, sodium dihydrogenphosphate/sodium tetraborate, sodium tetraborate/sodium carbonate, hydrochloric acid/sodium carbonate, sodium dihydrogenphosphate/sodium hydroxide, ammonium chloride/ammonia, sodium dimethylglicinate/hydrochloric acid, boric acid+potassium chloride/sodium carbonate, and sodium carbonate/sodium hydrogencarbonate.

Any of the above buffering agents are usable in the present invention. It was found that a greater buffering capability of the color ink leads to more effective reduction of the bleeding. Therefore, the buffering agent preferably contains at least one compound selected from the group consisting of ammonium salts and amine salts of organic acids and inorganic acids, and at least one compound selected from the group consisting of alkali metal hydroxides, ammonia, basic amines, and basic amino acids.

The content of the above compounds is suitably adjusted to satisfy the condition that pH change of the color ink upon addition of 1.5 mL of aqueous 1N sulfuric acid to 50 mL of the color ink is buffered to be not more than 1.0. The amount of addition of the buffering agent has to be limited not to impair the color developability, ink ejection stability, and other reliability of the ink-jet recording ink.

The color ink preferably contains, in addition to the above components, preferably at least one surfactant having the same polarity as the colorant of the ink or being nonionic. The intended penetrativity and viscosity and other properties required for the ink-jet ink can be achieved more satisfactorily by incorporation of the surfactant. The surfactant therefor may be an ionic surfactant, a nonionic surfactant, or an ampholytic surfactant shown below, or a mixture of two or more thereof.

(Anionic Surfactant)
Fatty acid salts, salts of acidic esters of higher alcohols, alkylbenzene sulfonate salts, phosphate ester salts of higher alcohols, alkyl sulfate salts, alkylsulfate ester salts, dialkylsulfosuccinate salts, alkyl sulfoacetate salts, dialkyl sulfosuccinate ester salts, and so forth;

(Cationic Surfactant)
Aliphatic amine salts, quaternary ammonium salts, alkylpyridinium salts, and so forth;

(Nonionic Surfactant)
Higher alcohol-ethylene oxide adducts, alkylphenolethylene oxide adducts, aliphatic ethylene oxide adducts, polyhydric alcohol fatty acid ester-ethylene oxide adducts, aliphatic amide-ethylene oxide adducts, higher alkylamineethylene oxide adducts, polypropylene glycol-ethylene oxide adducts, fatty acid esters of polyhydric alcohols, fatty acid amides of alkanolamines, and so forth;

(Ampholytic Surfactant)
Amino acid type ampholytic surfactants, betaine type amphoteric surfactants, and so forth are exemplified.

The above surfactants are usable in the present invention. Of these surfactants, particularly preferred are nonionic surfactants including higher alcohol-ethylene oxide adducts, alkylphenol-ethylene oxide adducts, ethylene oxidepropylene oxide copolymers, and acetylene glycol-ethylene oxide adducts. The above ethylene oxide adducts preferably contains 4 to 20 moles of added ethylene oxide.

The amount of addition of the above-mentioned surfactant is not specially limited, but preferably ranges from 0.01% to 10%, more preferably from 0.1% to 5.0% by weight based on the total weight of the ink. At the content lower than 0.01% by weight, the intended penetrativity cannot necessarily be obtained depending on the type of the surfactant. At the content higher than 10% by weight, the initial viscosity of the ink becomes excessively high undesirably.

The respective inks constituting the ink set of the present invention may contain, in addition to the above components, a moisturizing agent such as urea, thiourea, ethylene urea, alkylurea, alkylthiourea, dialkylurea, dialkylthiourea, and like nitrogen-containing compounds; and an additive such as a pH controlling agent, a viscosity controlling agent, an antiseptic, an antioxidant, an evaporation-promoting agent, a rust-preventing agent, a fungicide, and a chelating agent.

The aforementioned ink set of the present invention comprising a black ink and a color ink or color inks is useful in ink-jet recording which conducts recording by ejecting ink droplets through an orifice in response to recording signals, particularly in ink-jet recording employing thermal energy for ejecting the ink droplets. For proper recording with the ink set of the present invention, the ink-jet recording system can be employed which ejects ink droplets by a thermal energy applied to respective color inks held in the recording head in response to recording signals. An embodiment of the ink-jet recording apparatus employing the ink-jet recording method is explained below.

Figure 2:
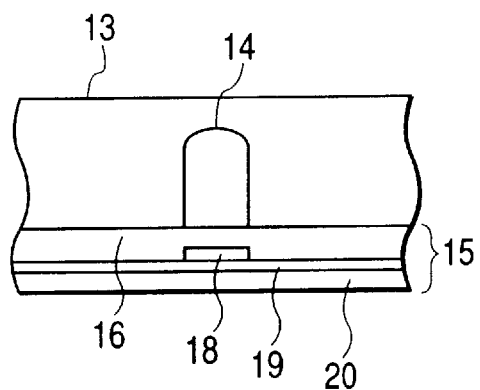
FIG. 2 is a sectional view taken in the line 2—2 of FIG. 1.
Figure 3:
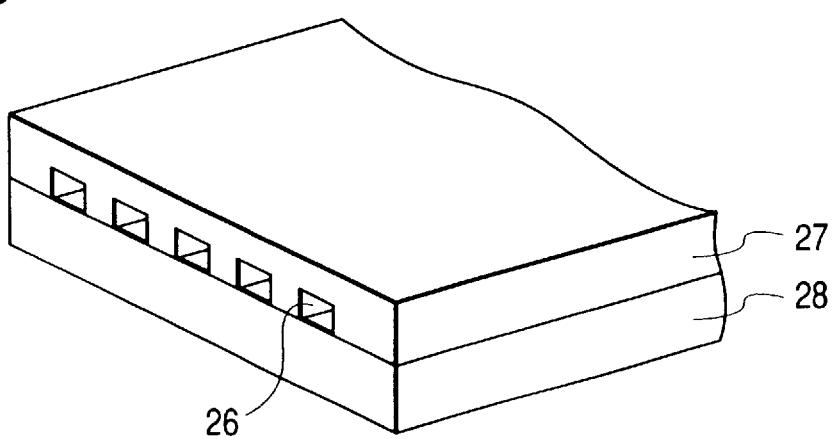
FIG. 3 is a perspective drawing of external appearance of a multi-head consisted of the head shown in FIG. 1.

FIGS. 1, 2, and 3 show an example of constitution of a head, the main part of the apparatus.

FIG. 1 is a sectional view of a head 13 along an ink flow path. FIG. 2 is a sectional view of the head taken along line 2—2 in FIG. 1. The head 13 is constructed by bonding a plate of glass, ceramics, plastics, or the like having a groove 14 for ink flow with a heating head 15 for thermosensitive recording g(not limited to the thin film head shown in the drawing). The heating head 15 is constituted of a protection layer 16 formed from silicon oxide, or the like; aluminum electrodes 17-1, 17-2; a heating resistor layer 18 formed from nichrome or the like; a heat-accumulating layer 19; and a substrate 20 made of a heat-radiating material such as alumina.

Ink 21 reaches an ejection orifice (fine hole) 22, and forms there a meniscus 23 by Pressure P. On application of an electric signal information to the electrodes 17-1, 17-2 of the head 13, the region denoted by a symbol n on the heating head 15 generates heat abruptly to form a bubble in the ink there, the pressure of the bubble pushes out the meniscus 23 to eject the ink 21 through the ejection orifice 22 in a shape of droplets 24. The ejected ink droplet 24 travels toward a recording medium 25.

FIG. 3 shows a external appearance of a multi-head having juxtaposed plural heads shown in FIG. 1. The multi-head is formed by bonding a glass plate 27 having multi-nozzles 26 with a heat-generating head 28 like the one shown in FIG. 1.

Figure 4:
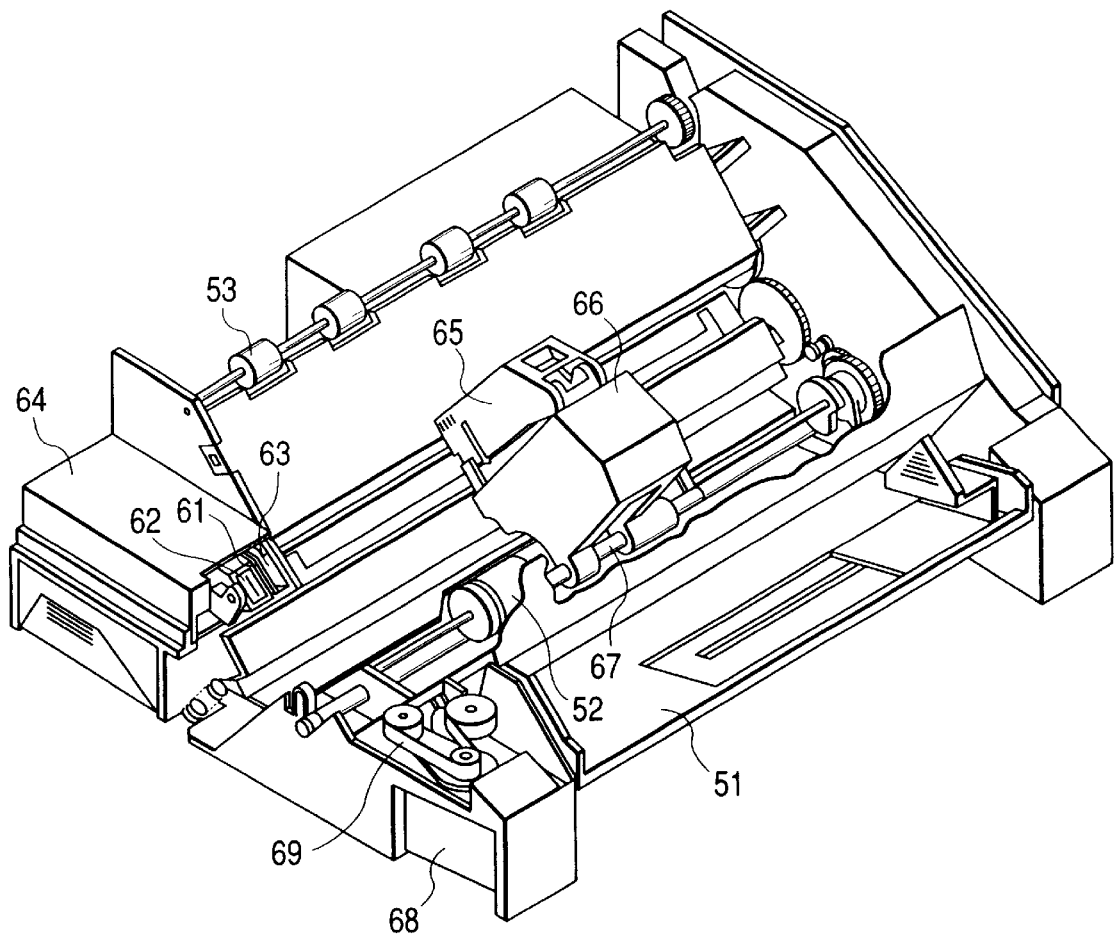
FIG. 4 is a schematic perspective view of an ink-jet recording apparatus.

FIG. 4 shows an example of the entire appearance of the ink-jet recording apparatus equipped with such a head. In FIG. 4, a blade 61 as a wiping member is held at one end of the blade by a blade-holding member, forming a fixed end in a shape of a cantilever. The blade 61 is placed at a position adjacent to the recording region of the recording head, and is held, in this example, so as to protrude into the moving path of the recording head. A cap 62 for capping the projected opening face is placed at a home position adjacent to the blade 61, and is constituted such that it moves in the direction perpendicular to the moving direction of the recording head to come into contact with the ejection nozzle face to cap the nozzle. An ink absorbent 63 is placed at a position adjacent to the blade 61, and is held so as to protrude into the moving path of the recording head 65 in a manner similar to that of the blade 61.

The blade 61, the cap 62, and the ink absorbent 63 constitute an ejection recovery device 64. The blade 61, and the ink absorbent 63 serve to remove off water, dust, and the like from the face of the ink ejection nozzle. A recording head 65 has an energy-generating means for the ejection, and conducts recording by ejecting the ink onto a recording medium opposing to the ejection nozzle face. A carriage 66 is provided for supporting and moving the recording head 65. The carriage 66 is engaged slidably with a guide rod 67. A portion of the carriage 66 is connected (not shown in the drawing) to a belt 69 driven by a motor 68, so that the carriage 66 is movable along the guide rod 67 to the recording region of the recording head 65 and the adjacent region thereto.

A paper sheet delivery device 51 for delivery of a recording medium and a paper sheet delivery roller 52 driven by a motor (not shown in the drawing) delivers a recording medium to the position opposing to the ejection nozzle face of the recording head. With the above constitution, the recording medium is delivered to the front of the ejection orifice of the recording head 65 with the progress of the recording, and is further delivered to a paper discharge device provided with paper sheet-discharging rollers 53.

In the above constitution, when the recording head 65 returns to the home position on completion of recording, the cap 62 of the ejection-recovery device 64 is positioned out of the moving path of the recording head 65, and the blade 61 is allowed to protrude to the moving path. Thereby, the ejection nozzle face of the recording head 65 is wiped. To cap the ejection face of the recording head 65, the cap 62 protrudes toward the moving path of the recording head to come into contact with the ejection nozzle face.

When the recording head 65 is moved from the home position to the record-starting position, the cap 62 and the blade 61 are at the same position as in the above-mentioned wiping step, so that the ejection nozzle face of the recording head 65 is also wiped in this movement. The recording head 65 is moved to the home position not only at the completion of the recording and at the time of ejection recovery, but is also moved at a predetermined time intervals during recording from the recording region. The nozzle is wiped by this movement.

Figure 5:
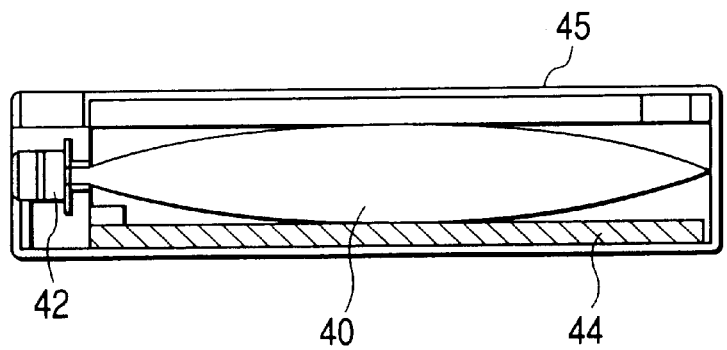
FIG. 5 is a vertical sectional view of an ink cartridge.

FIG. 5 is a sectional view of an example of an ink cartridge 45 which holds an ink to be supplied through an ink supplying member such as a tube. An ink container 40, for example, an ink bag, contains an ink to be supplied, and has a rubber plug 42 at the tip. Insertion of a needle (not shown in the drawing) into the plug 42 enables supply of the ink from the ink bag 40 to the head. A waste-ink absorbent 44 serves to absorb waste ink. The liquid-contacting face of the ink container is preferably formed of polyolefins, especially polyethylene, in the present invention.

Figure 6:
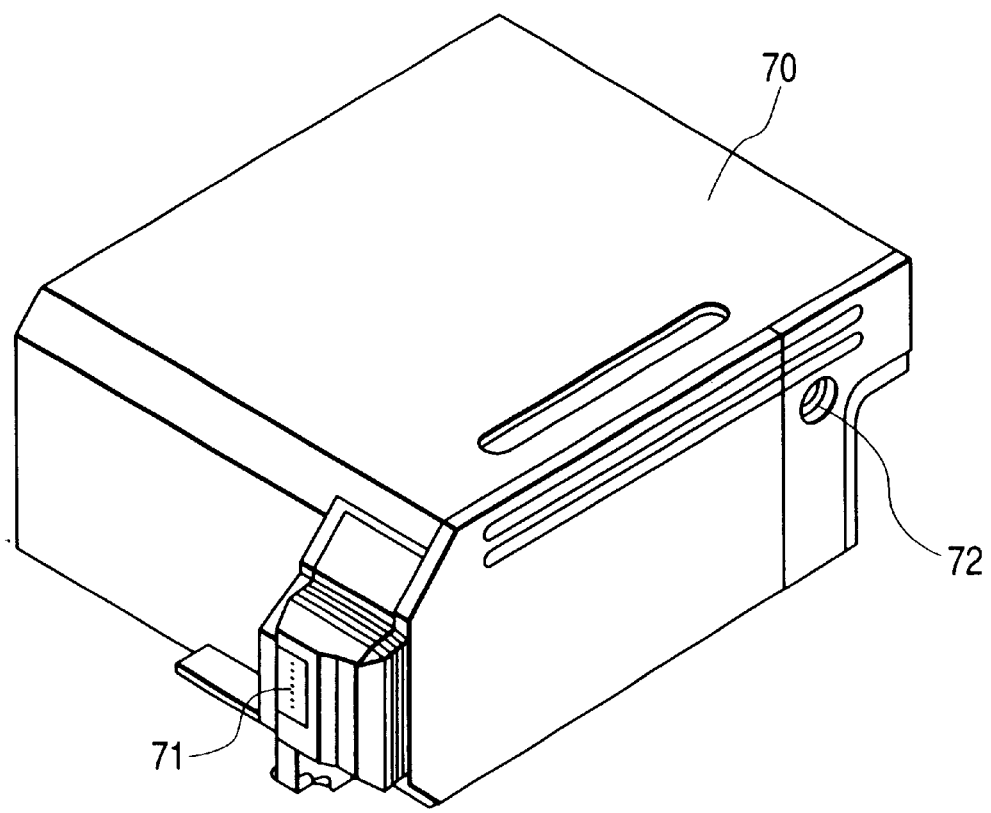
FIG. 6 is a perspective view of a recording unit.

The ink-jet recording apparatus used in the present invention is not limited to the above-mentioned one which has separately a head and an ink cartridge. Integration thereof as shown in FIG. 6 may suitably be employed. In FIG. 6, a recording unit 70 houses an ink holding member such as an ink absorbent, and the ink in the absorbent is ejected through a plurality of orifices of a head 71.

The ink absorbent is made preferably of a resin such as polyurethane, cellulose, polyvinyl acetate, and polyolefins. An air communication hole 72 allows the interior of the recording unit to communicate with the open air. This recording unit 70 is used in place of the recording head shown in FIG. 4, and is detachable from the carriage 66.

Figure 7:
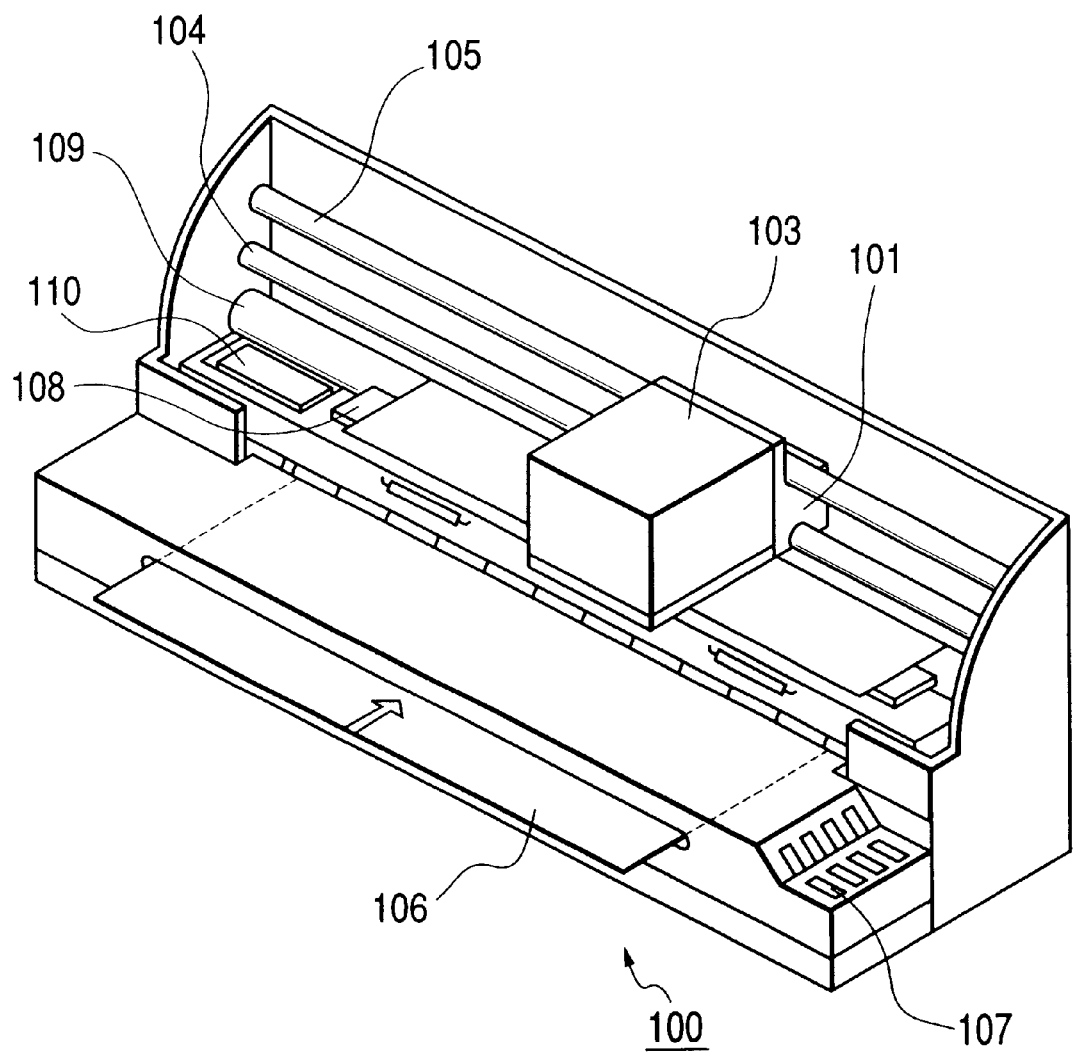
FIG. 7 is a schematic perspective view of an ink-jet recording apparatus.

FIG. 7 is a perspective view of an ink-jet recording apparatus applicable to the present invention. A recording medium 106 is inserted to a paper feed position of the recording apparatus 100, and is delivered to recording region of a recording head unit 103. In the recording region, a platen 108 is provided under the recording medium. A carriage 101 is movable by two guide shafts 104, 105 in a prescribed directions to scan reciprocally the recording region. The carriage 101 bears a recording head unit 103 comprising recording heads for plural color inks and ink tanks for supplying the recording heads with an ink respectively.

The plural colors of the inks in this example of the ink-jet recording apparatus are four colors of black (Bk), cyan (C), magenta(M), and yellow (Y).

At the left end of the carriage movement range, a recovery unit 110 is placed on the lower side, and caps the ejection orifice of the recording head during a non-recording period. This left end is called a home position of the recording head. The numeral 107 denotes a switch and a display element. The switch is used for turning on and off the power source of the recording apparatus and selection of the recording mode, and the display element displays the state of the recording apparatus.

Figure 8:
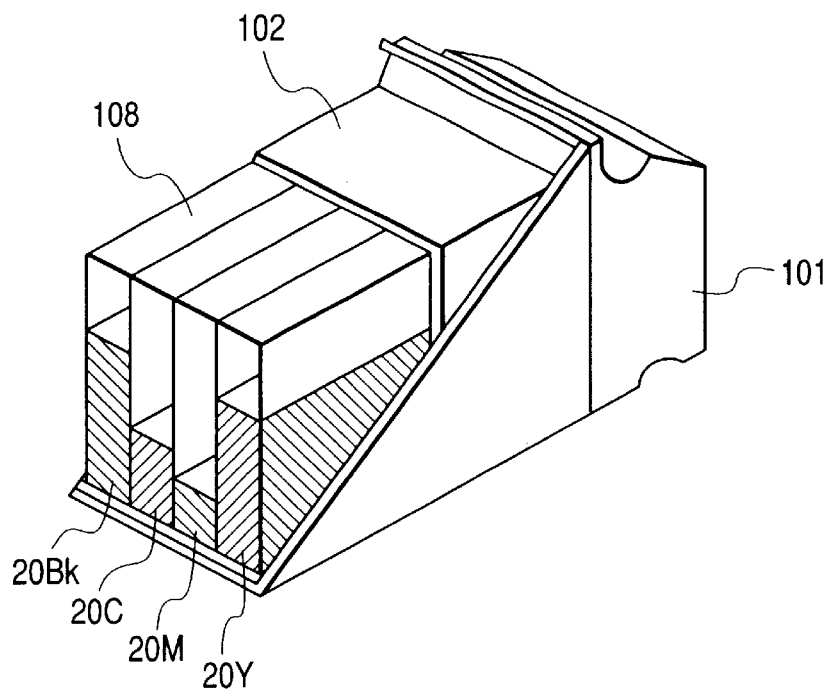
FIG. 8 is a perspective view of a recording head unit employed in the recording apparatus shown in FIG. 7.

FIG. 8 is a perspective view of the recording unit employed in the recording apparatus shown in FIG. 7. The carriage 101 bears recording head 102 for ejecting the respective color inks of Bk, C, M, and Y; a Bk ink tank 20Bk; a C ink tank 20C; an M ink tank 20M; and a Y ink tank 20Y. The respective tanks are connected through a connection member to the recording head to supply the ink to the ejection orifice. In another example, the tanks for the color inks of C, M, and Y may be integrated in one body.

Figure 9:
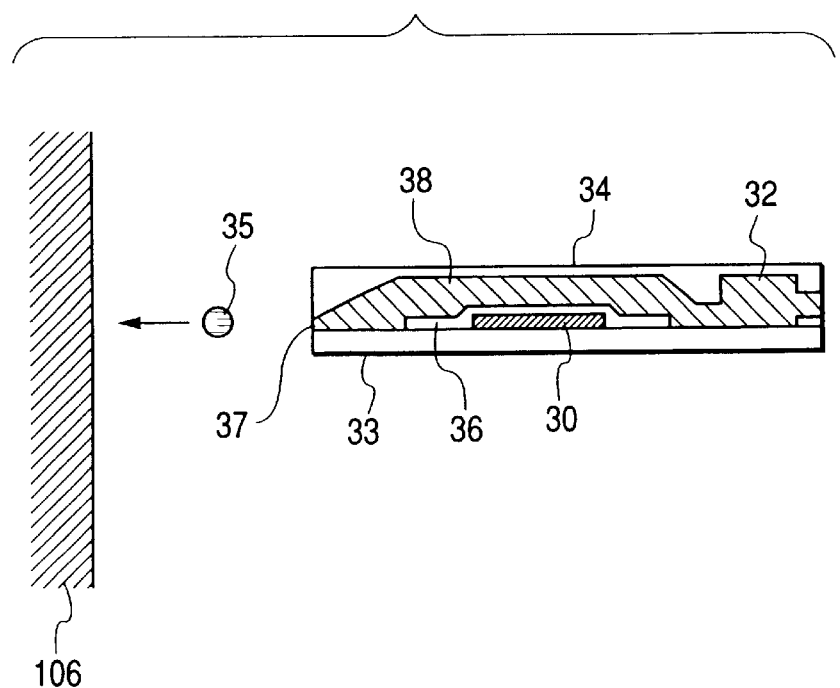
FIG. 9 is an enlarged sectional view of a part of the recording head around the heat-generator.

FIG. 9 is an enlarged sectional view of a part of the recording head around the heat-generator. The recording apparatus of this example provides an electro-thermal heat generator for each of the ink ejection orifices to apply driving signals to the heat generators in response to the recording information to eject the inks though the nozzles.

The heat generators 30 are constituted to generate heat separately for each of the respective nozzles.

The ink in the nozzle heated quickly by the heat generated by the heater 30 forms a bubble by film boiling. The pressure caused by the bubble formation ejects an ink droplet 35 toward a recording medium 106 as shown in FIG. 9 to form a character or an image on the recording medium. The ejection orifices 37 are connected respectively to an ink flow path 38. On the rear side of the ink flow paths 38, a common liquid chamber 32 is provided. For each of the ink flow paths corresponding to the respective ejection orifice, are provided the electro-thermal transducing heater 30 for generating the heat for ejection of the ink droplet, and electrode wirings for supplying the electric power. The heater 30 and the electrode wirings are formed by a film-forming technique on a substrate 33. On the heater 30, a protection film 36 is formed to prevent direct contact of the ink with the heater. Further, on this substrate, partition walls 34 are formed in lamination form of a resin or a glass material to construct the above ejection orifices, ink flow path, common liquid chamber, and the like.

The recording system employing an electro-thermal transducer as the heater utilizes bubble formation caused by application of thermal energy for ink droplet ejection, and is generally called a bubble jet recording system. The ink jet recording system is explained above as an embodiment of the recording apparatus of the present invention. However, the present invention is applicable to other types of ink-jet recording system such as a piezo type recording system employing piezo element.

Another example of the recording apparatus and the recording head suitable for the present invention are described below.

Figure 10:
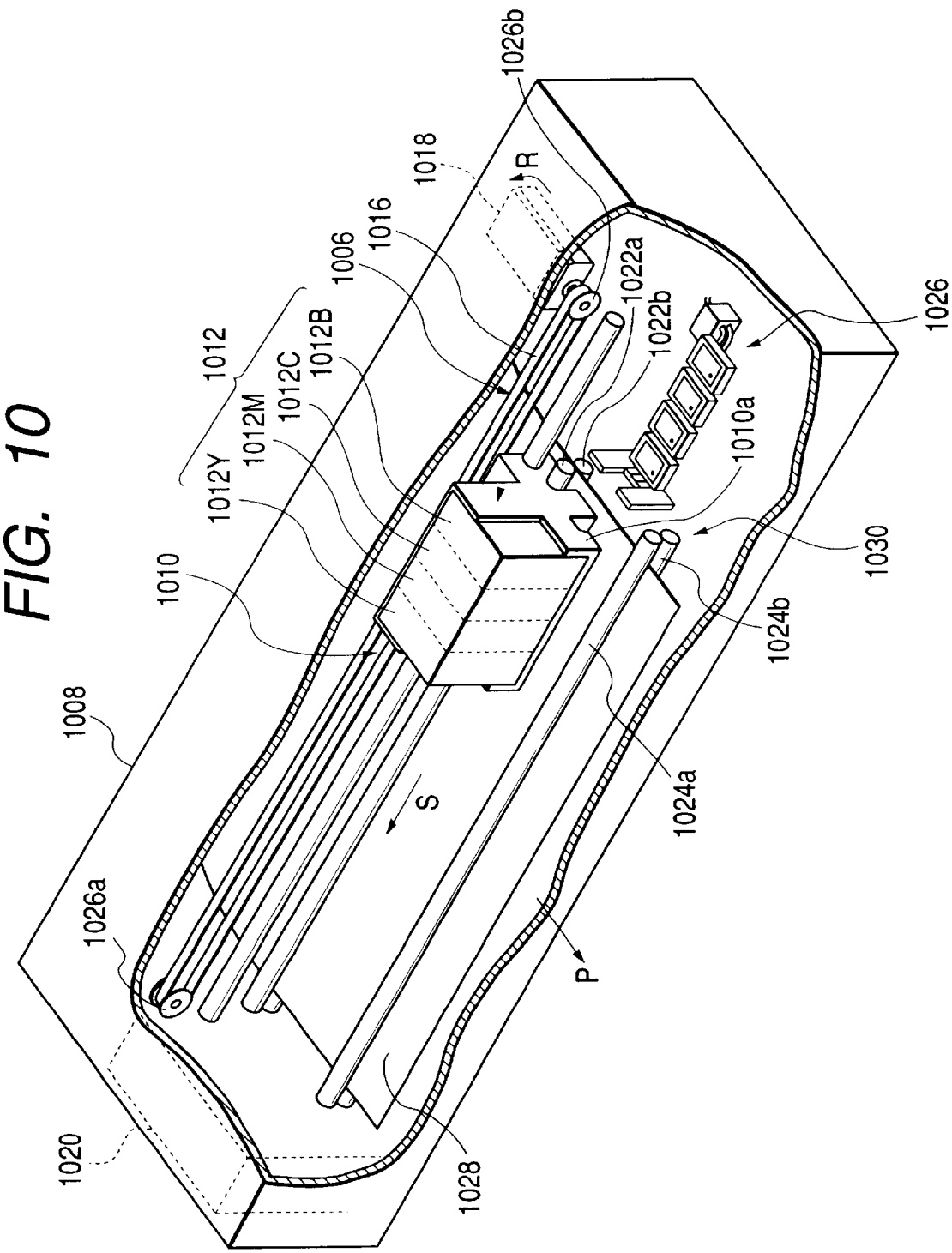
FIG. 10 is a schematic perspective view illustrating the main portion of an ink-jet printer for mounting a liquid-ejecting head.

FIG. 10 is a schematic perspective view illustrating the main portion of an ink-jet printer employing a liquid ejecting head of the present invention, in which the bubble is communicated with the open air on ink ejection.

In FIG. 10, the ink-jet printer comprises a delivery device 1030, a recording device 1010, and a movement-driving device 1006. The delivery device 1030 is placed in a length direction in a casing 1008 to deliver a paper sheet 1028 as the recording medium intermittently in a direction of the arrow P. The recording device 1010 is driven reciprocally in a direction S perpendicular to the paper sheet delivery direction. The movement-driving mechanism 1006 drives reciprocally the recording device 1010.

The driving mechanism 1006 comprises pulleys 1026a and 1026b set on a rotation axes opposing at a prescribed distance, a belt 1016 wound to the pulleys, roller units 1022a and 1022b, a carriage member 1010a of the recording device 1010 placed in parallel to roller units 1022a and 1022b, and a motor 1018 for driving the belt 1016 connected to the carriage member 1010a in normal and reversed directions.

Turning the belt 1016 in the arrow R direction in FIG. 10 by the motor 1018, the carriage member 1010a of the recording device 1010 is moved in the arrow S direction in FIG. 10 by a prescribed distance, whereas turning the belt 1016 in the direction reverse to the arrow R by the motor 1018, the carriage member 1010a of the recording device 1010 is moved in the direction reverse to the arrow S by a prescribed distance. At one end of the movement-driving mechanism 1006, a recovery unit 1026 is provided at the home position of the carriage member 1010a in opposition to the ink ejection orifice arrangement to recover the ejection performance of the recording device 1010.

In the recording device 1010, ink-jet cartridges 1012Y, 1012M, 1012C, and 1012B (hereinafter occasionally called simply "cartridge") each are demountable separately and independently from the carriage member 1010a for the respective colors: for example, yellow, magenta, cyan, and black.

Figure 11:
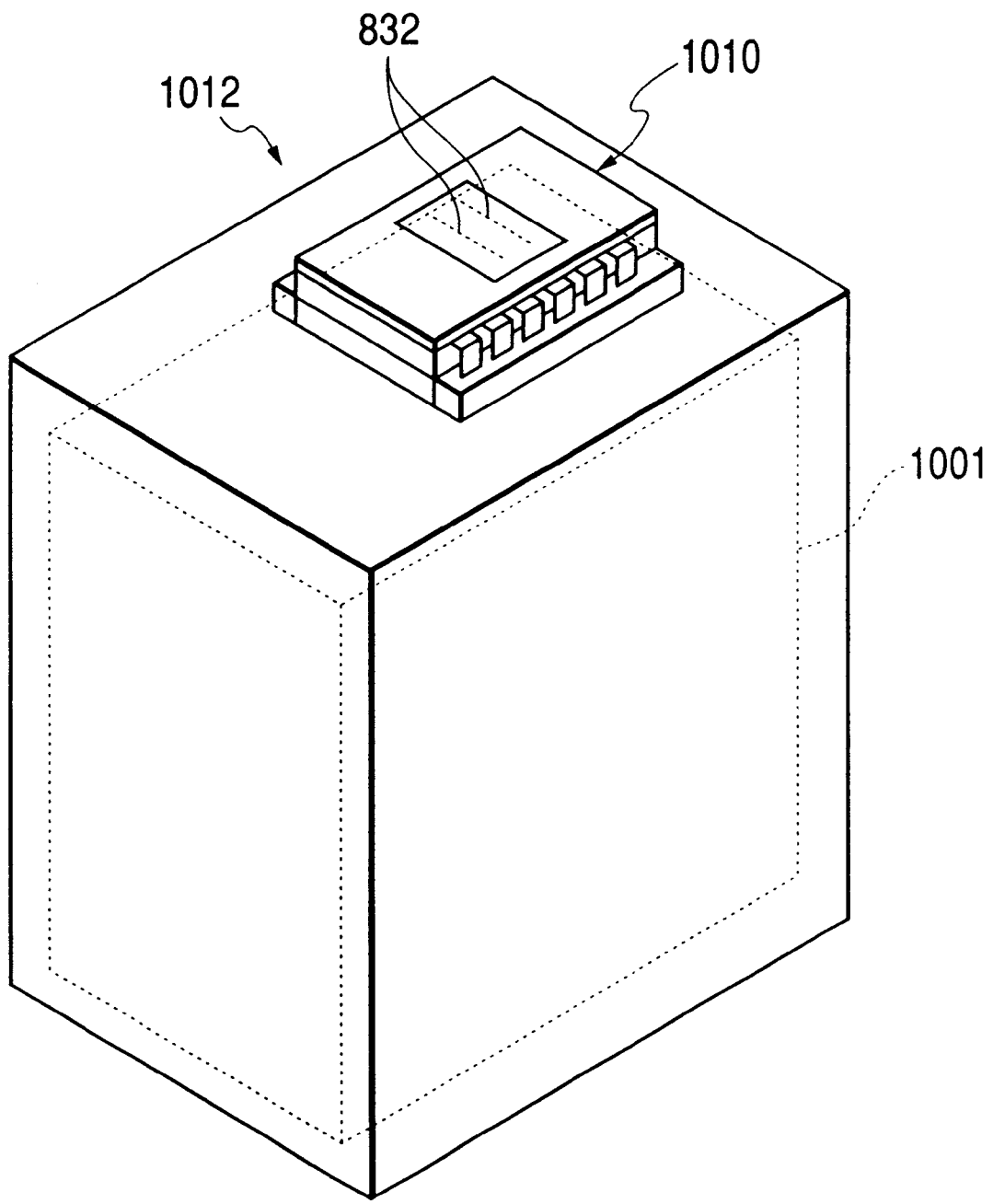
FIG. 11 is a schematic perspective view of an ink cartridge having a liquid-ejecting head.

FIG. 11 shows an example of the ink-jet cartridge mountable onto the ink-jet recording apparatus described above. The cartridge 1012 of this example is of a serial type, and is mainly constituted of an ink-jet head 1010 and a liquid tank 1001 for containing an ink or a like liquid. The ink-jet recording head has many ejection orifices 832 for ejecting the liquid. The ink or a like liquid is introduced from the liquid tank 1001 through a delivery path (not shown in the drawing) to a common liquid chamber in the liquid ejection head 1010 (see FIG. 12). The cartridge 1012 is formed in integration of ink-jet recording head 1010 and the liquid tank 1001 in one body. The liquid can be replenished to the liquid tank 1001. The liquid tank 1001 may be connected exchangeably to the liquid ejection head 1010.

A specific example of the liquid ejection head described above for the ink-jet printer having the aforementioned constitution is explained below in more detail.

Figure 12:
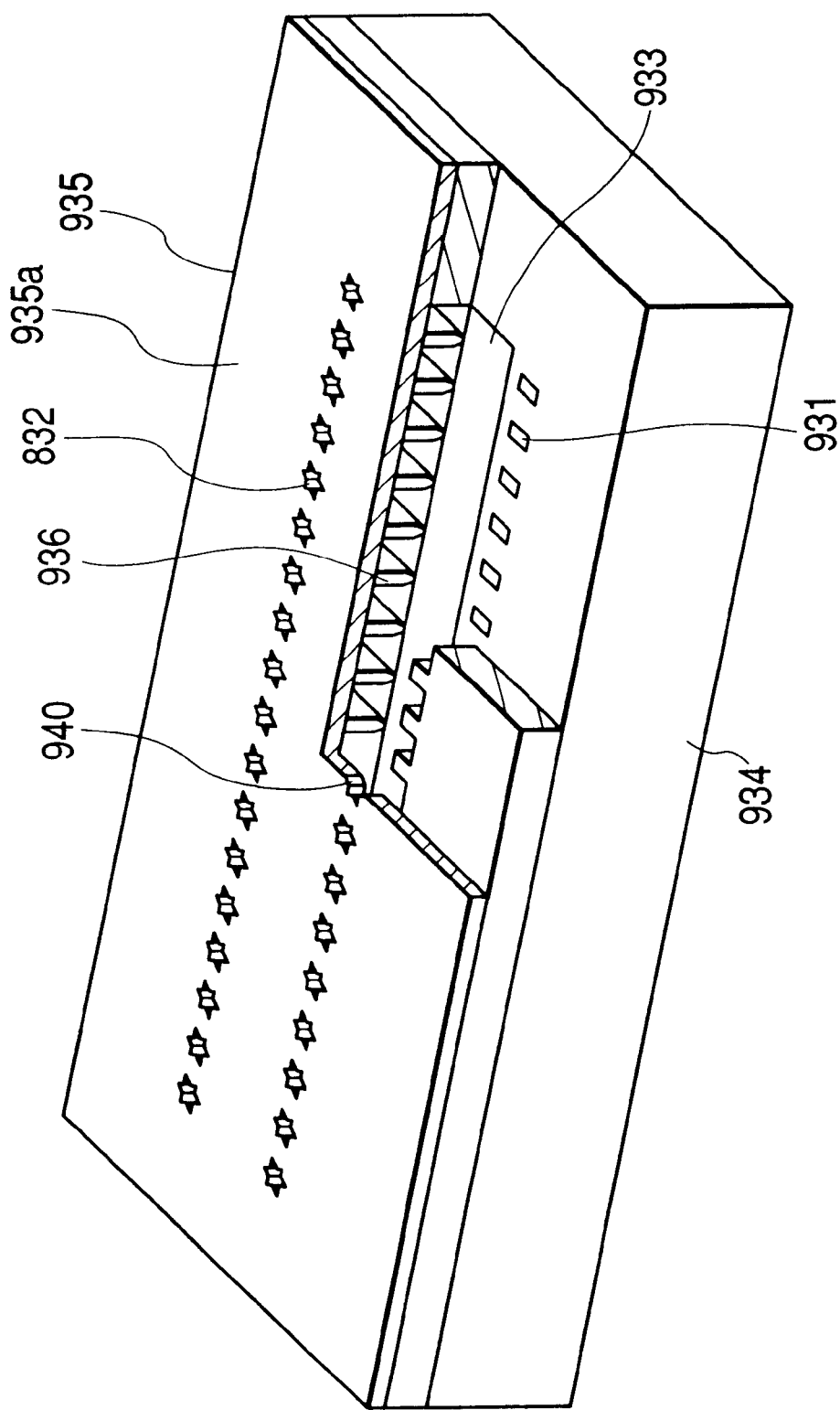
FIG. 12 is a schematic perspective view of the main portion of a liquid-ejecting head.

FIG. 12 is a schematic perspective view of the main portion of a basic embodiment of the liquid ejection head of the present invention. FIGS. 13 to 16 are front views illustrating the shape of the ejection orifice of the liquid ejection head shown in FIG. 12. In these drawings, electric wirings for driving the electro-thermal transducing element are omitted.

The liquid ejection head of this example has a substrate 934 made of glass, ceramics, plastics, or metal as shown in FIG. 12. The material for the substrate is not essential of the present invention, and is not limited, provided that the material is capable of functioning as a part of the liquid-flow-path-constituting material, and functioning as a supporter for an ink-ejection energy generation element, and a supporter for the material layer for forming the liquid path and the ejection orifice as described later. In this example, Si substrate (wafer) is employed as the substrate plate. The ejection orifice can be formed by a laser beam. Otherwise, the orifice plate (ejection orifice plate) 935 can be made of a photosensitive resin, and the ejection orifice can be formed by an optical aligner such as MPA (mirror projection aligner).

In FIG. 12, the substrate 934 has electro-thermal transducing elements 931 (hereinafter occasionally called "heater") and an ink-supplying hole 933 in a shape of a long ditch-shaped through-hole as a common liquid chamber. On the both sides in the length direction of the ink supply hole 933, heaters 931 as thermal energy generating means are arranged in one line each in a staggered arrangement with the interval of 300 dpi, for example. Ink flow path walls 936 are formed on this substrate 934 for formation of ink flow paths. On the ink flow path walls 936, an ejection orifice plate 935 having ejection orifices 932 is provided.

In FIG. 12, the ink flow path walls 936 and the ejection orifice plate 935 are shown as separate members. However, the ink flow path walls 936 may be formed by a spin coating method to form simultaneously the ejection orifice plate 935 with the same material. In this example, the ejection orifice plate face 935a is treated for water repellency.

In this example, recording is conducted with a serial type head which conducts scanning in the arrow S direction in FIG. 10, for example, at a dot density of 1200 dpi at driving frequency of 10 kHz with a minimum ejection time interval of 100 $\mu$s for each ejection orifice.

Figure 13:
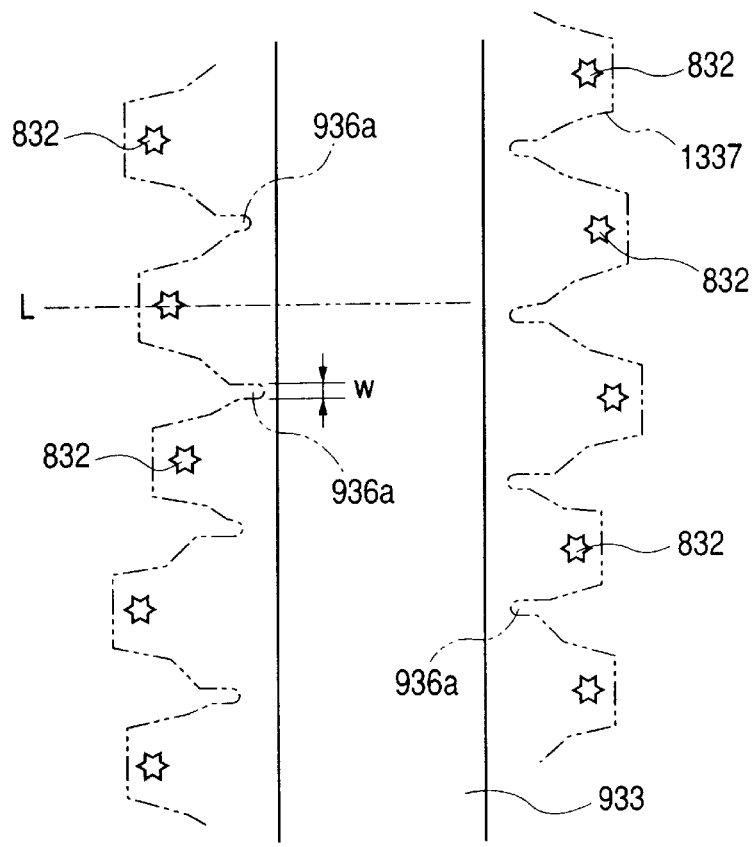
FIG. 13 is a conceptional diagram of a part of a liquid-ejecting head.
Figure 16:
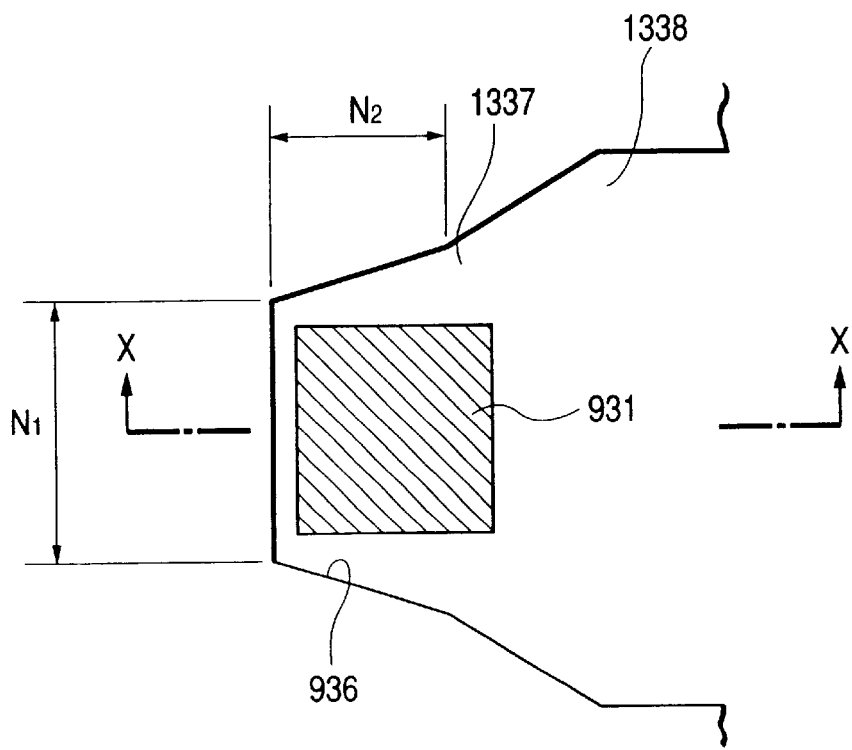
FIG. 16 is a schematic drawing of the main portion of the head shown in FIG. 13.

As to the practical dimension of the head, for example, the partition wall 936a for partitioning the fluid in adjacent nozzles as shown in FIG. 13 has a width w of 14 μm. In FIG. 16, a bubbling chamber 1337 formed of the ink flow path wall 936 has $N_1$ (width of bubbling chamber)=33 μm and $N_2$ (length of bubbling chamber)=35 μm. The heater 931 has a size of 30 μm×30 μm, and a resistance of 53 Ω, and is driven by a driving voltage of 10.3 V. The ink flow path wall 936 and the partition wall 936a have a height of 12 μm, respectively. The ejection orifice plate has a thickness of 11 μm.

Figure 17:
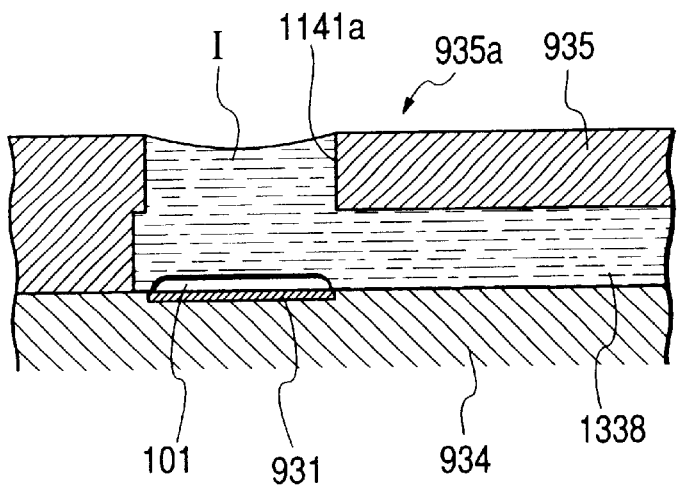
FIG. 17 is a schematic sectional view for explaining the process of the liquid ejection through the liquid-ejection head with the lapse of time corresponding to the sectional view at X—X in FIG. 16 in combination with FIGS. 18 to 24.

The section 940 of the ejection orifice 832 taken in the direction perpendicular to the ink ejection direction (thickness direction of the orifice plate 935) is nearly in a shape of a star, which has six protruding portions 832a with an obtuse angle and six denting portions 832b with an acute angle placed alternately. Thereby six grooves are formed along the direction of the orifice plate thickness (liquid ejection direction), the groove having the denting portions 832b as the tops far from the center O of the ejection orifice and the adjacent protruding portions 832a near to the center O of the ejection orifice as the base. The position of the grooves is shown in FIG. 17 by a numeral 1141a.

Figure 14:
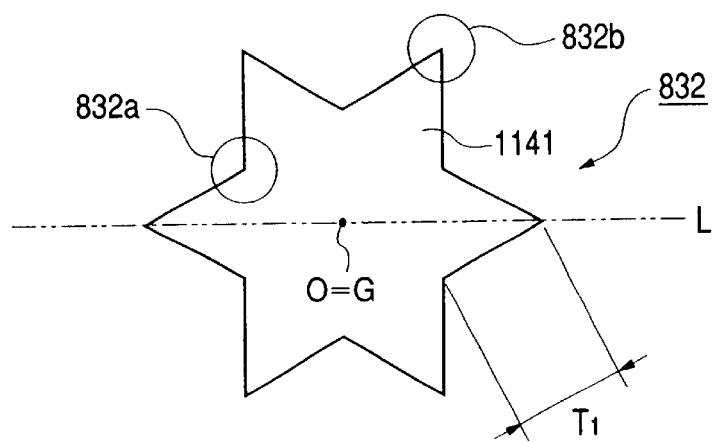
FIG. 14 is an enlarged view of the ejection orifice of the liquid-ejection head shown in FIG. 13.

In this example, the ejection orifice 940 is in a shape of two equilateral triangles superposed with the one triangle turned by an angle of 60°. In FIG. 14, the length $T_1$ is 8 μm. The tops of the protruding portions 832a have an angle of 120°, and the bases of the denting portions 832b have an angle of 60°.

Therefore, the center O of the ejection orifice coincides with the gravity center G of the polygon formed by connecting the center points (center (gravity center) of a figure formed by connecting the top and the adjacent two bottoms of the groove) between the adjacent grooves. In this example, the ejecting orifice 832 has an opening area of 400 μm², and the sectional area of one groove (area of a figure formed by connecting the top and the adjacent two bottoms of the groove) is about 33 μm².

Figure 15:
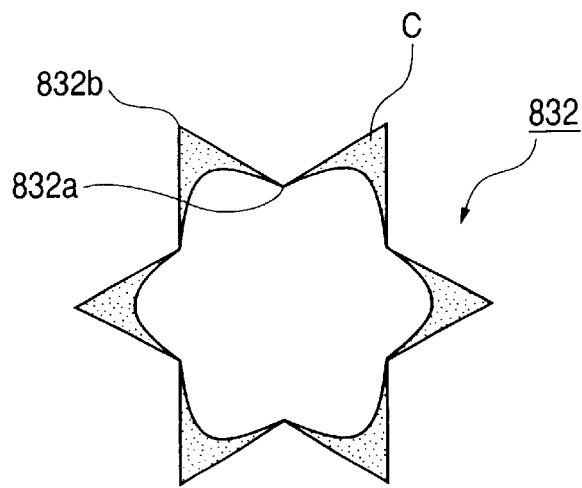
FIG. 15 is a schematic view illustrating adhesion of the ink at the ink-ejection orifice shown in FIG. 14.

FIG. 15 shows schematically the state of contact of the ink with the orifice wall at the ejection orifice shown in FIG. 14.

The process of ejection of the liquid through the ink-jet recording head of the above constitution is described by reference to FIGS. 17 to 24. FIGS. 17 to 24 are sectional views of the bubbling chamber 1337 taken along line X—X in FIG. 16 for explaining the process of liquid ejection in the liquid ejection head shown in FIGS. 12 to 16. In these sectional views, the ends of the ejection orifice 940 in the orifice plate thickness direction correspond to the tops 1141a of the grooves 1141.

Figure 18:
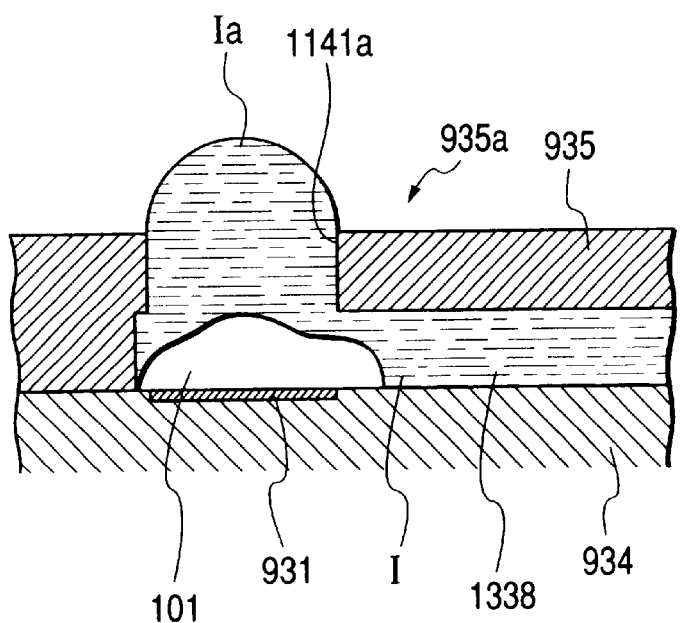
FIG. 18 is a schematic sectional view for explaining the process of the liquid ejection through the liquid-ejection head with the lapse of time corresponding to the sectional view at X—X in FIG. 16 in combination with FIG. 17 and FIGS. 19 to 24.
Figure 19:
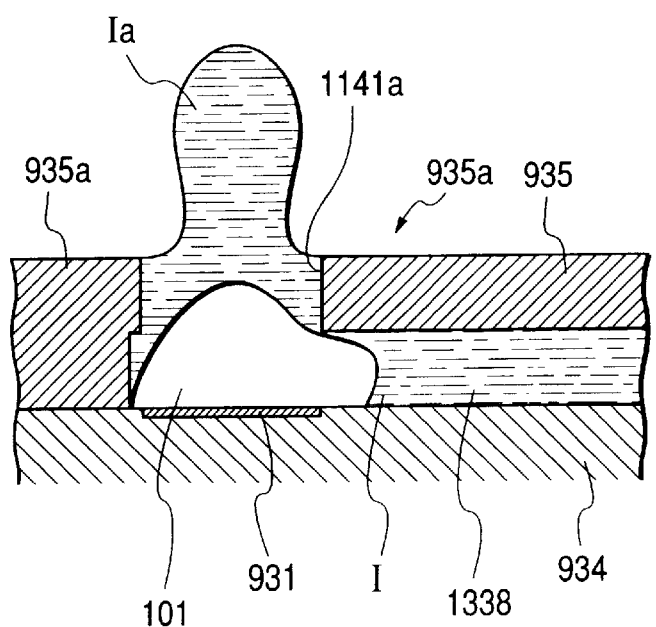
FIG. 19 is a schematic sectional view for explaining the process of the liquid ejection through the liquid-ejection head with the lapse of time corresponding to the sectional view at X—X in FIG. 16 in combination with FIGS. 17 and 18 and FIGS. 20 to 24.
Figure 20:
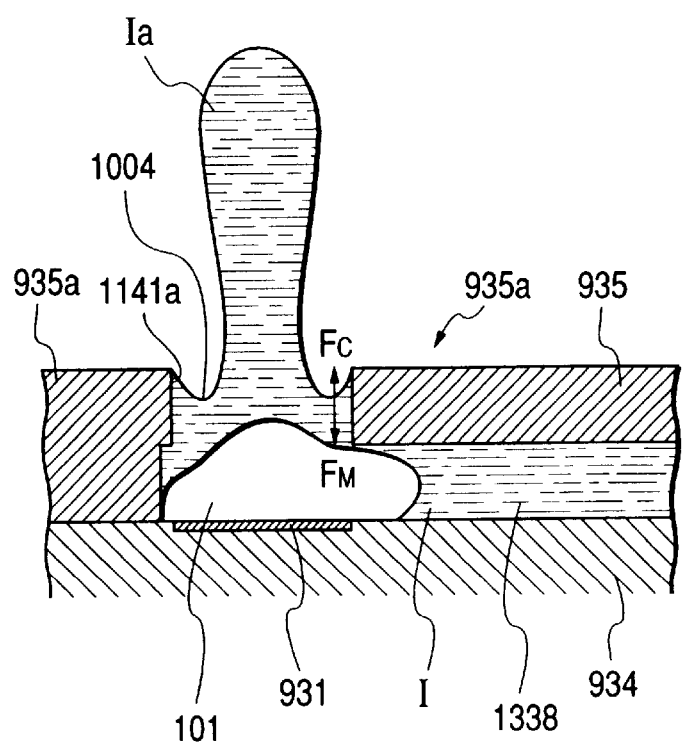
FIG. 20 is a schematic sectional view for explaining the process of the liquid ejection through the liquid-ejection head with the lapse of time corresponding to the sectional view at X—X in FIG. 16 in combination with FIGS. 17 to 19 and FIGS. 21 to 24.
Figure 23:
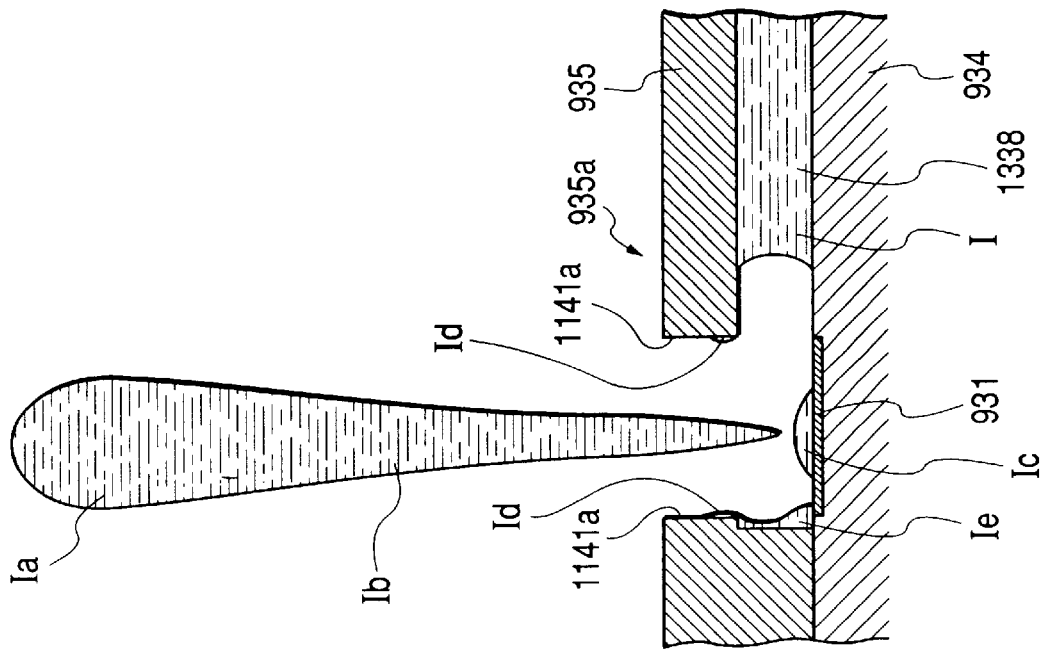
FIG. 23 is a schematic sectional view for explaining the process of the liquid ejection through the liquid-ejection head with the lapse of time corresponding to the sectional view at X—X in FIG. 16 in combination with FIGS. 17 to 22 and FIG. 24.
Figure 24:
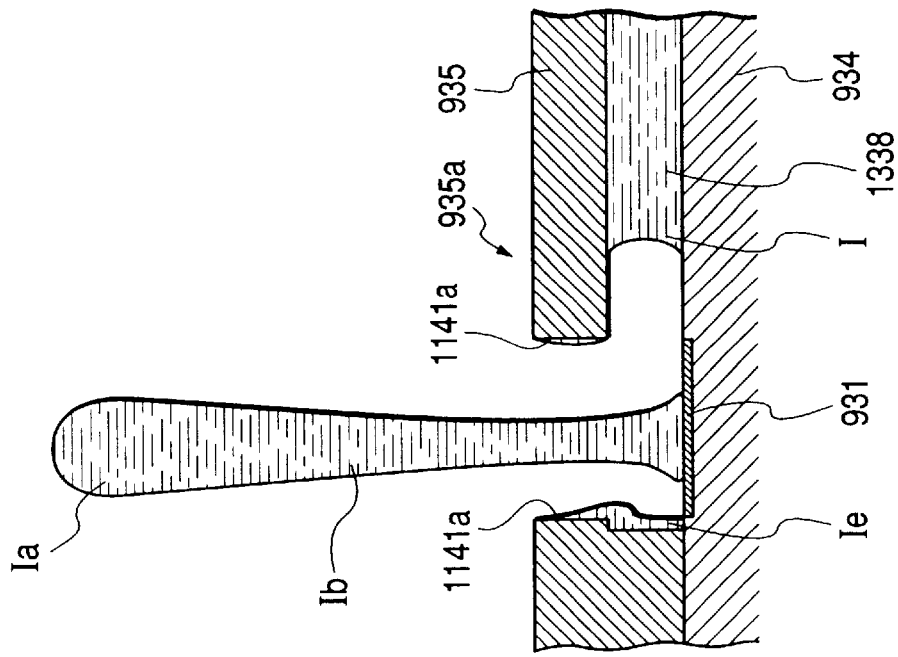
FIG. 24 is a schematic sectional view for explaining the process of the liquid ejection through the liquid-ejection head with the lapse of time corresponding to the sectional view at X—X in FIG. 16 in combination with FIGS. 17 to 23.

FIG. 17 shows bubble formation in a film state. FIG. 18 shows the state at about 1 μs after the state of FIG. 17. FIG. 19 shows the state at about 2 μs; FIG. 20, at about 3 μs; FIG. 21, at about 4 μs; and FIG. 22, at about 5 μs; FIG. 23, at about 6 μs; and FIG. 24, at about 7 μs after the state of FIG. 17. In the description below, the term "fall" or "falling" signifies the movement toward the electro-thermal transducer, not fall to the gravity direction regardless of the head fixation direction.

Firstly, electric current is applied to a heater 931 in response to a signal. Thereby a bubble 101 is formed on the heater 931 in the liquid flow path 1338 as shown in FIG. 17. In about 2 μs, the bubble grows rapidly in volume as shown in FIGS. 18 and 19. At the maximum volume of the bubble 101, the bubble height exceeds the height of the ejection orifice face 935a. In this state, the gas pressure in the bubble comes to decrease to one fraction (one over several to one over ten and several) of the atmospheric pressure.

At about 2 μs after the formation of the bubble 101, the bubble as mentioned above begins to shrink from the maximum volume, and at about the same time the meniscus 1004 begins to form. This meniscus 1004 also moves backward or falls toward the heater 931 as shown in FIG. 20.

In this example, when the meniscus 1004 moves backward, the plural grooves 1141 distributed in the ejection orifice exerts capillary force to the liquid in the direction $F_C$ reverse to the backward movement direction $F_M$ at the groove 1141. Consequently, any variation of the state of the bubble 101 can be corrected such that the shape of the meniscus moving backward and the shape of the main liquid droplet Ia (hereinafter called "liquid" or "ink" occasionally) are nearly symmetrical to the center of the ejection orifice.

In this example, the falling velocity of the meniscus 1004 is higher than the shrinking velocity of the bubble 101, so that the bubble 101 comes to communicate with the open air near the lower face of the ejection orifice 832 at about 4 μs after the formation of the bubble as shown in FIG. 21. At the same time, the portion of the liquid (ink) near the enter axis of the ejection orifice 832 falls toward the heater 931, since the liquid (ink) Ia brought back by the negative pressure of the bubble 101 before the communication of the bubble with the open air maintains a velocity toward the heater 931 owing to inertia after the communication with air.

The liquid (ink) having fallen toward the heater 931 reaches the surface of the heater 931 at about 5 μs after the formation of the bubble 101 as shown in FIG. 22, and spreads to cover the surface of the heater 931 as shown in FIG. 23. The liquid spreading over the surface of the heater 931 has a velocity vector along the surface of the heater 931 in the horizontal direction, but loses the vector crossing the surface of the heater 931, vertical vectors. Therefore, this portion of the liquid tends to remain on the surface of the heater 931 to pull down the liquid having the velocity vector in the ejection direction.

Thereafter, a portion Ib of the liquid between the liquid spreading on the surface of the heater 931 and the liquid (main liquid droplet) on the upper side becomes thinner. At about 7 μs after the formation of the bubble 101, the portion of the liquid Ib is cut at the center of the surface of the heater 931, thereby the main liquid droplet Ia having a velocity vector in the ejection direction is separated from the liquid ic spreading on the surface of the heater 931. The separation is preferably caused inside the liquid flow path 1338, more preferably nearer to the electro-thermal transducer element 931 than to the ejection orifice 832.

The main liquid droplet Ia is ejected through the center portion of the ejection orifice 832 without deviation of the direction and without deformation to hit onto the prescribed position of a recording face of a recording medium. The liquid Ic spreading on the surface of the heater 931 remains on the surface of the heater 931, while in a conventional method the liquid Ic is driven out as a satellite droplet following the main liquid droplet.

By the prevention of the satellite droplet ejection as above, the splashing which tends to be formed by the satellite droplet can be prevented, and soiling of the recording face of the recording medium caused by mist is reliably prevented. In FIGS. 21–24, the symbol Id indicates the ink adhering to the groove (ink in the groove), and the symbol Ie indicates the ink remaining in the liquid flow path.

With the liquid ejection head of this example, the liquid is ejected in the shrinkage stage of the bubble after the growth to the maximum volume of the bubble, and the ejection direction of the main liquid droplet is stabilized by the plural grooves distributed around the center of the ejection orifice. Thereby, the liquid ejection head ejects the liquid droplet without deviation of the ejection direction with high hitting precision of the liquid droplets. Further, the ejection can be stabilized even at variation of bubbling at a high driving frequency to realize high-speed fine printing.

In particular, with the liquid ejection head of this example, the liquid droplet is ejected at the bubble shrinkage stage by communication of the bubble with the open air, whereby mist generation at the ejection by communication with the open air can be prevented, and the adhesion of the liquid droplet onto the ejection orifice face which may cause abrupt failure of the ejection can also be prevented.

Another type of recording head suitable for practicing the present invention is an edge-shooter type head disclosed in Japanese Patent No. 2,783,647, which conducts liquid droplet ejection by communication of the bubble with the open air on the liquid droplet ejection.

The present invention is effective for the ink-jet type recording head and recording apparatus which ejects liquid droplets by utilizing thermal energy to conduct recording.

The typical constitution and the principle thereof are disclosed in U.S. Pat. Nos. 4,723,129 and 4,740,796. This type of constitution can be applicable to so-called on-demand type ones, and continuous type ones. In particular, this type apparatus is effective as an on-demand type apparatus. In the on-demand type apparatus, at least one driving signal corresponding to recording information is applied to an electro-thermal transducer arranged on a liquid-retaining sheet or a liquid flow path to generate thermal energy to quickly cause film boiling at the heating face of a recording head, and consequently to form a bubble in the liquid (ink) in one-to-one correspondence with the driving signal. The growth and shrinkage of the bubble is utilized in ejection of the liquid (ink) through the ejection orifice to form a liquid droplet. A pulsed driving signal is preferred for quick and precise bubble growth and shrinkage to achieve liquid (ink) ejection with high responsiveness:.

As the pulsed driving signal, suitable are those disclosed in U.S. Pat. Nos. 4,463,359 and 4,345,262. The recording can be conducted more satisfactorily by employing the conditions of temperature elevation rate of the heating face disclosed in U.S. Pat. No. 4,313,124.

The recording heads having constitution in which the heater is placed at a bent portion as disclosed in U.S. Pat. Nos. 4,558,333, and 4,459,600 are included in the present invention, in addition to the recording head disclosed in the above-cited patents having constitution of combination of an ejection orifice, a liquid flow path, and an electro-thermal transducer (linear liquid flow path or right-angle liquid flow path).

The present invention is effective also for the constitution disclosed in Japanese Patent Application Laid-Open No. 59-123670 in which a common slit is employed for plural electro-thermal transducers, or for the constitution disclosed in Japanese Patent Application Laid-Open No. 59-138461 in which an opening is provided for ejection portion for absorbing pressure waves of thermal energy.

The present invention is also effective for the full-line type recording head which has a head length corresponding to the maximum recording breadth of the recording medium. The full-line type recording head may have a constitution in which plural recording heads as described aforementioned patents are combined for the length corresponding to the maximum breadth of the recording medium, or may have a constitution in which the head is constructed in one body.

The present invention is also effective for exchangeable tip type recording heads which can be connected electrically to the main apparatus body and receive the ink supplied from the main apparatus body, and for a cartridge type recording head which has an ink tank provided integrally with the recording head.

A recovery means for the recording head and other auxiliary means may be added to the recording apparatus of the present invention for stabilizing the effects of the present invention. The additional means include head capping means, head cleaning means, head pressurizing or sucking means, preliminary heating means separate from or combined with the electro-thermal transducer. The practice of preliminary ejection mode is also effective for the stable recording.

The recording mode of the recording apparatus is not limited to one-color recording mode of black or another color, but may be a plural-color mode or a full-color mode by use of an integrally constituted head or combination of plural heads.

In the above examples of the present invention, the liquid ink is used for the explanation. However, the ink may be the one which solidifies at room temperature or lower, and softens or liquified at room temperature. In the ink-jet recording, the ink may be the one which becomes liquid at the time of signal application, since the temperature of the ink is generally controlled to be at a temperature of 30° C. to 70° C. to control the ink viscosity for stable ejection.

The temperature rise of the ink by the thermal energy may be prevented by utilizing the latent heat of the change of the state between the solid and the liquid. The ink may be the one which is solid in a storage state for prevention of evaporation of the ink. The present invention is applicable also to use of the ink which can be liquified by the thermal energy in correspondence with recording signals, ejected as a liquid ink, and begins to solidify at the time of landing onto a recording medium. The ink may be held in a liquid stat or a solid state in a cavity or through-hole of a porous sheet, opposing an electro-thermal transducer as disclosed in Japanese Patent Application Laid-Open Nos. 54-56847 and 60-71260. The present invention is most effective for practice of the film boiling system.

The recording apparatus for the present invention includes not only an image output terminal of information processing apparatus combined integrally or provided separately, but also copying machines in combination with a reader, and facsimile machines for sending or receiving information.

Figure 25:
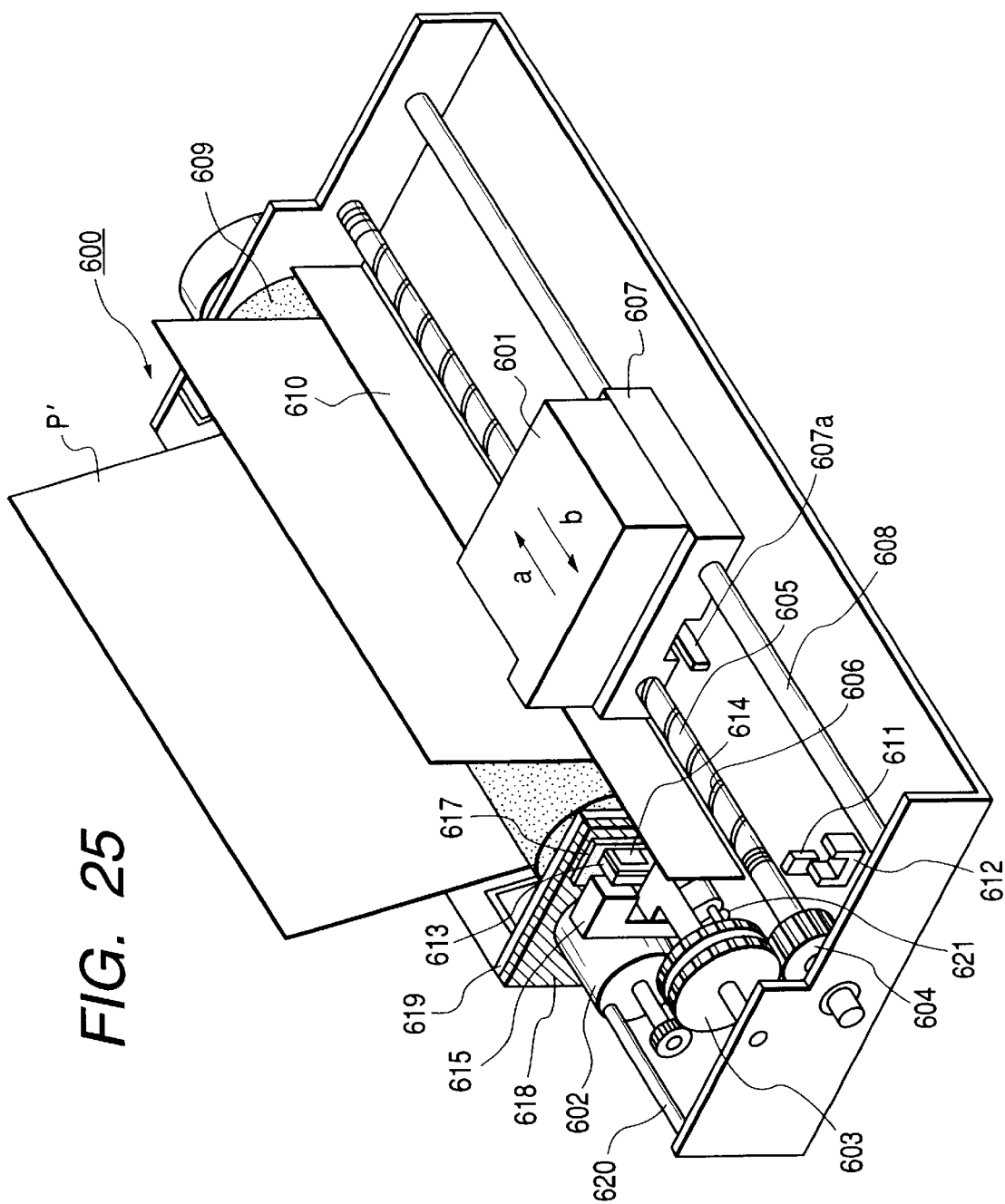
FIG. 25 is a schematic perspective view of an ink-jet recording apparatus 600 as an example of the liquid-ejection apparatus for mounting the liquid-ejection head of the present invention.

A liquid ejection apparatus employing a liquid ejection head of the present invention is described briefly below. FIG. 25 is a schematic perspective view of an example of an ink-jet recording apparatus 600 employing the liquid ejection head of the present invention.

In FIG. 25, the ink-jet head cartridge 601 is a combination in one body of the aforementioned liquid ejection head and an ink tank holding the ink to be supplied to the liquid ejection head. This ink-jet head cartridge 601 is mounted onto a carriage 607 which engages with a screw groove 606 of a leading screw 605 driven to rotate reversibly through transmission gears 603, 604 by driving motor 602. The ink-jet head cartridge 601 together with the carriage 607 is moved reciprocally in the directions indicated by arrows a and b by the driving motor 602. A recording medium P is delivered on a platen roller 609 by a recording medium-delivering means not shown in the drawing, and is pushed by a paper-pressing plate 610 against a platen roller 609 along the movement directions of the carriage 607.

Photo-couplers 611, 612 are provided near the one end of the leading screw 605. The photo-couplers detect the lever 607a of the carriage 607 at the home position to conduct switching of rotation direction of the driving motor 602 and other operation.

A supporting member 613 supports a capping member 614 to cap the front face (ejection face) of the ejection orifice of the ink-jet head cartridge 601. An ink-sucking means 615 sucks the ink in the capping member 614 accumulated by blank ejection or a like operation from the ink-jet cartridge. This ink sucking means 615 sucks the ink-head cartridge 601 through an opening (not shown in the drawing) of the cap for the head performance recovery. A cleaning blade 617 is provided so as to be moved by a driving member 618 in forward and backward directions (perpendicular to the movement direction of the carriage 607) for wiping the ejection orifice face of the ink-jet head cartridge 601. The cleaning blade 617 and a driving member 618 are supported by a main body supporter 619 movably forward and backward (perpendicularly to the carriage movement direction). The type of the cleaning blade 617 is not limited thereto and may be any known type cleaning blade.

In the recovery of performance of the liquid ejection head by sucking, a lever 620 for start of sucking is moved in accordance with the movement of a cam 621 engaging with the carriage 607. The driving force of the driving motor 602 is controlled by switching clutch or a like conventional transmission means. A control section for the ink-jet recording is equipped in the main body of the apparatus. This control section applies signals to the heat generator in the liquid ejection head of the ink-jet head cartridge 601 and controls the aforementioned mechanisms. The control system is not shown in the drawing.

The ink-jet recording apparatus 600 of the above constitution conducts recording on a recording medium P' delivered on a platen roller 609 by a recording medium delivering means. For the recording, the ink-jet head cartridge 601 moves reciprocally over the entire width of the recording medium P'.

EXAMPLES

The present invention is described below in more detail by reference to examples and comparative examples. The units "parts" and "%" are based on weight unless otherwise mentioned.

Firstly, the self-dispersible cationic carbon blacks were prepared as the colorant of the black ink as described below.
(Carbon Black 1)

To a solution of 3.08 g of $H_3N^+C_6H_4N^+(CH_3)_3Cl^-.I^-$ in 30 g of water, was added 1.69 g of silver nitrate with stirring. The formed precipitate was removed by filtration. The filtrate was added to a liquid suspension of 10 g of a carbon black in 70 g of water with stirring, the carbon black having a specific surface area of 230 $m^2/g$ and DBPA of 70 mL/100 g. Thereto, 2.25 g of concentrated hydrochloric acid, and a solution of 0.83 g of sodium nitrite in 10 g of water were added successively. Thereby, a diazonium salt having a group of $NN^+C_6H_4N^+(CH_3)_3$ of the structure shown below reacted with the carbon black. After nitrogen bubble formation by the reaction ceased, the liquid dispersion was dried in an oven at 120° C. The obtained reaction product was a carbon black having $C_6H_4N^+(CH_3)_3$ groups on the surface.

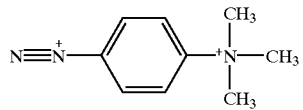

(Carbon Black 2)
A solution consisting of 2.12 g of 4-acetaminophenacyl chloride, 0.83 g of pyridine, and 6.4 g of dimethylsulfoxide was stirred overnight. Thereto, 0.8 g of pyridine and 1 g of dimethylsulfoxide was added further, and the solution was stirred for five hours. To the solution, 50 mL of ether was added, and the formed acetamidophenacylpyridinium chloride was collected by filtration. The collected acetamidophenacylpyridinium chloride was dissolved in water. The solution was filtrated. To the filtrate, 1.7 g of concentrated hydrochloric acid was added. This solution was boiled for one hour, and cooled. Acetone was added thereto, and the formed 4-aminophenacylpyridinium chloride hydrochloride was collected by filtration.

Two grams of the obtained 4-aminophenacylpyridinium chloride hydrochloride was dissolved in 15 g of water, and 4.5 g of a basic ion exchange resin (Amberlite IRA400-OH) was added thereto. The mixture was stirred, and filtered to remove the ion exchange resin. Thereby an aqueous solution of 4-aminophenacylpyridinium chloride was obtained. The aqueous solution of 1.3 g of 4-aminophenacylpyridinium chloride in 25 g of water was refluxed with 1 g of silver nitrate for 90 minutes. The formed precipitate was removed by filtration. To the filtrate, was added 5 g of carbon black having a specific surface area of 200 $m^2/g$, and DBPA of 122 mL/100 g. The mixture was heated to about 80° C. Thereto, were added 0.52 g of concentrated hydrochloric acid, and a solution of sodium nitrite in a small amount of water, successively. The dispersion was stirred further for 1.5 hours. Thereby, a diazonium salt having a $NN^+C_6H_4COCH_2$ $(N^+C_5H_5)$ group of the structure shown below was formed. This formed salt reacted with the carbon black.

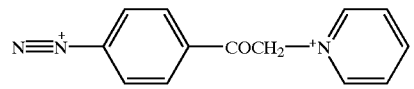

As the result, a carbon black was obtained which has a $C_6H_4COCH_2(N^+C_5H_5)$ group on the surface.

Black Inks 1-1 and 1-2 having the compositions below were prepared with the above self-dispersible carbon black.

| (Black Ink 1-1) | |
| --- | --- |
| Carbon Black 1 prepared above | 5 parts |
| Diethylene glycol | 10 parts |
| Trimethylolpropane | 10 parts |
| Acetylenol EH | 0.1 part |
| (trade name, Kawaken Fine Chemical K.K.) | |
| Water | 74.9 parts |
| (Black Ink 1-2) | |
| Carbon Black 2 prepared above | 4 parts |
| Glycerin | 7 parts |
| 1,5-Pentanediol | 8 parts |
| Ethylene glycol | 7 parts |
| Acetylenol EH | 0.2 parts |
| (trade name, Kawaken Fine Chemical K.K.) | |
| Water | 73.8 parts |

A cyan ink base was prepared from the components below, and Cyan Inks 1-1 to 1-4 were prepared by use of the cyan ink base.

| (Cyan Ink Base) | |
| --- | --- |
| Glycerin | 7 parts |
| Triethylene glycol | 10 parts |
| Hexylene glycol | 5 parts |
| C.I. Direct Blue 199 | 3 part |
| Acetylenol EH | 1 part |
| (trade name, Kawaken Fine Chemical K.K.) | |

-continued

| (Cyan Ink 1-1) | |
|---|---|
| Cyan Ink Base above | 26 parts |
| Water | 74 parts |
| (Cyan Ink 1-2) | |
| Cyan Ink Base above | 26 parts |
| Ammonium sulfate | 2 parts |
| Lithium hydroxide | 0.3 part |
| Water | 71.7 parts |
| (Cyan Ink 1-3) | |
| Cyan Ink Base above | 26 parts |
| Citric acid | 1 part |
| Diethanolamine | 4 parts |
| Water | 69 parts |
| (Cyan Ink 1-4) | |
| Cyan Ink Base above | 26 parts |
| Sodium hydrogencarbonate | 1 part |
| Sodium carbonate | 2 parts |
| Water | 71 parts |

A magenta ink base was prepared from the components below, and Magenta Inks 1-1 to 1-4 were prepared by use of the magenta ink base.

| (Magenta Ink Base) | |
|---|---|
| Triethylene glycol | 10 parts |
| Urea | 10 parts |
| Isopropyl alcohol | 4 parts |
| C.I. Acid Red 94 | 3 part |
| Acetylenol EH | 1 part |
| (trade name, Kawaken Fine Chemical K.K.) | |
| (Magenta Ink 1-1) | |
| Magenta Ink Base above | 28 parts |
| Water | 72 parts |
| (Magenta Ink 1-2) | |
| Magenta Ink Base above | 28 parts |
| Ammonium succinate | 1.5 parts |
| Arginine | 3 parts |
| Water | 67.5 parts |
| (Magenta Ink 1-3) | |
| Magenta Ink Base above | 28 parts |
| Ammonium acetate | 2.5 parts |
| Sodium hydroxide | 0.4 part |
| Water | 69.1 parts |
| (Magenta Ink 1-4) | |
| Magenta Ink Base above | 28 parts |
| Succinic acid | 1 part |
| Monoisopropanolamine | 4 parts |
| Water | 67 parts |

A yellow ink base was prepared from the components below, and Yellow Inks 1-1 to 1-4 were prepared by use of the yellow ink base.

| (Yellow Ink Base) | |
|---|---|
| Glycerin | 5 parts |
| 2-Pyrrolidone | 10 parts |
| Isopropyl alcohol | 4 parts |
| C.I. Acid Yellow 23 | 3 part |
| Acetylenol EH | 1 part |
| (trade name, Kawaken Fine Chemical K.K.) | |

-continued

| (Yellow Ink 1-1) | |
|---|---|
| Yellow Ink Base above | 23 parts |
| Water | 77 parts |
| (Yellow Ink 1-2) | |
| Yellow Ink Base above | 23 parts |
| Lysine | 3 parts |
| Water | 74 parts |
| (Yellow Ink 1-3) | |
| Yellow Ink Base above | 23 parts |
| Ammonium acetate | 2 parts |
| Triethanolamine | 6 part |
| Water | 69 parts |
| (Yellow Ink 1-4) | |
| Yellow Ink Base above | 23 parts |
| Ammonium benzoate | 1.2 parts |
| Ammonia | 0.8 part |
| Water | 75 parts |

Examples 1–6 and Comparative Examples 1 and 2

The ink sets of Examples 1–6 and Comparative Examples 1 and 2 are prepared by combining the above as shown in Table 1.

TABLE 1

Combination of Inks for Ink Set

| | Ink No. | | | |
|---|---|---|---|---|
| | Black | Cyan | Magenta | Yellow |
| Example | | | | |
| 1 | 1-1 | 1-2 | 1-2 | 1-2 |
| 2 | 1-1 | 1-3 | 1-3 | 1-3 |
| 3 | 1-1 | 1-4 | 1-4 | 1-4 |
| 4 | 1-2 | 1-2 | 1-2 | 1-2 |
| 5 | 1-2 | 1-3 | 1-3 | 1-3 |
| 6 | 1-2 | 1-4 | 1-4 | 1-4 |
| Comparative Example | | | | |
| 1 | 1-1 | 1-1 | 1-1 | 1-1 |
| 2 | 1-2 | 1-1 | 1-1 | 1-1 |

The buffering capability against change of a hydrogen ion concentration of the color inks employed in the respective ink color sets are examined by measuring the change of pH caused by addition of 1.5 mL of aqueous 1N sulfuric acid solution to 50 mL of the color ink. Table 2 shows the results. The pH values of Black Inks 1-1 and 1-2 were also shown in Table 2.

TABLE 2 pH and Buffering Capability of Inks of Y, M, C, and Bk

| | | pH of Ink | | | |
|---|---|---|---|---|---|
| Color | Ink No. | Before sulfuric acid addition | After sulfuric acid addition | Change | Buffering capability |
| Y | 1-1 | 6.21 | 2.11 | 4.1 | No |
| | 1-2 | 9.15 | 8.72 | 0.43 | Yes |
| | 1-3 | 9.45 | 9.28 | 0.17 | Yes |
| | 1-4 | 10.13 | 9.8 | 0.33 | Yes |

TABLE 2-continued pH and Buffering Capability of Inks of Y, M, C, and Bk

| Color | Ink No. | pH of Ink Before sulfuric acid addition | pH of Ink After sulfuric acid addition | Change | Buffering capability |
|---|---|---|---|---|---|
| M | 1-1 | 6.54 | 2.35 | 4.19 | No |
|   | 1-2 | 9.57 | 9.34 | 0.23 | Yes |
|   | 1-3 | 10.3 | 10.12 | 0.18 | Yes |
|   | 1-4 | 10.41 | 10.31 | 0.1 | Yes |
| C | 1-1 | 7.14 | 1.97 | 5.17 | No |
|   | 1-2 | 10.05 | 9.84 | 0.21 | Yes |
|   | 1-3 | 9.35 | 9.22 | 0.13 | Yes |
|   | 1-4 | 10.12 | 9.94 | 0.18 | Yes |
| Bk | 1-1 | 5.43 | — | — | — |
|   | 1-2 | 5.51 | — | — | — |

(Evaluation Method and Evaluation Standard)

An ink-jet recording apparatus BJF 800 (manufactured by Canon Inc.) was employed which has an on-demand type multi-head ejecting ink by applying thermal energy in response to a recording signal. The recording apparatus was modified for the evaluation test. The ink set described above was placed on the modified apparatus, and the printing test was conducted. Two kinds of plain paper sheets were used as the recording medium for the printing test: PB Paper (copying paper, supplied by Canon Inc.) and 4024 Paper (copying paper, supplied by Xerox Co.). Table 3 shows the results.

(Bleeding between Black Ink and Color Inks)

Printing was conducted with the ink set on the above plain paper sheet to form a pattern in which a black solid area printed with the black ink and a solid area printed with the yellow, magenta, or cyan ink are adjacent to each other. The evaluation standard was as indicated below. Table 3 shows the results.

A: Bleeding is not observed visually in all of the boundary.

B: Slight bleeding is observed visually, but is acceptable practically.

C: Bleeding is observed visually.

TABLE 3

| Recording medium | Color | Example 1 | 2 | 3 | 4 | 5 | 6 | Comparative Example 1 | 2 |
|---|---|---|---|---|---|---|---|---|---|
| PB paper | Y | A | A | A | A | A | A | C | C |
|   | M | A | A | A | A | A | A | C | C |
|   | C | A | A | A | A | A | A | C | C |
| 4024 paper | Y | A | A | A | A | A | A | C | C |
|   | M | A | A | A | A | A | A | B | B |
|   | C | A | A | A | A | A | A | B | B |

Examples and Comparative Examples of Inks Containing Colorant-Enclosing Resin

As the components of the black inks, the colorant is microencapsulated in a resin by the procedure shown below.

| (Microcapsule 1) | |
|---|---|
| C.I. Solvent Black 3 | 10 parts |
| Styrene/N,N-dimethylaminoethyl methacrylate copolymer (molecular weight: 40,000) | 40 parts |
| Methyl ethyl ketone | 50 parts |

The above materials were mixed and dissolved. The solution was emulsified by phase reversion with acetic acid as the neutralizing agent. Then the methyl ethyl ketone was removed to finally obtain an aqueous dispersion of microcapsule having an average particle diameter of 0.08 μm with a solid matter content of 20% by weight. This is referred to as Microcapsule 1.

| (Microcapsule 2) | |
|---|---|
| Carbon black MCF-88 (Mitsubishi Chem. Co.) | 20 parts |
| Styrene/N,N-dimethylaminoethyl methacrylate copolymer (molecular weight: 45,000) | 40 parts |
| Methyl ethyl ketone | 40 parts |

The above materials were mixed and dissolved. The solution was emulsified by phase reversion by use of acetic acid as the neutralizing agent. Then the methyl ethyl ketone was removed to finally obtain an aqueous dispersion of the cationic resin containing a carbon black having an average particle diameter of 0.10 μm with a solid matter content of 20% by weight. This is referred to as microcapsule 2.

Black Inks 2-1 to 2-4 having the compositions below were prepared with the above self-dispersible carbon blacks and the colorant-enclosing resins (microcapsules).

| (Black Ink 2-1) | |
|---|---|
| Carbon Black 1 prepared above | 5 parts |
| Microcapsule 1 prepared above | 1.5 parts |
| Glycerin | 10 parts |
| Trimethylolpropane | 10 parts |
| Acetylenol EH (trade name, Kawaken Fine Chemical K.K.) | 0.1 part |
| Water | 73.4 parts |

| (Black Ink 2-2) | |
|---|---|
| Carbon Black 2 prepared above | 5 parts |
| Microcapsule 2 prepared above | 1.5 parts |
| Glycerin | 7 parts |
| 1,5-pentanediol | 8 parts |
| Ethylene glycol | 7 parts |
| Acetylenol EH (trade name, Kawaken Fine Chemical K.K.) | 0.2 part |
| Water | 71.3 parts |

| (Black Ink 2-3) | |
|---|---|
| Carbon Black 1 prepared above | 5 parts |
| Diethylene glycol | 10 parts |
| Trimethylolpropane | 10 parts |
| Acetylenol EH (trade name, Kawaken Fine Chemical K.K.) | 0.1 part |
| Water | 74.9 parts |

| (Black Ink 2-4) | |
|---|---|
| Carbon Black 2 prepared above | 4 parts |
| Glycerin | 7 parts |

-continued

| | |
|---|---|
| 1,5-pentanediol | 8 parts |
| Ethylene glycol | 7 parts |
| Acetylenol EH | 0.2 part |
| (trade name, Kawaken Fine Chemical K.K.) | |
| Water | 73.8 parts |

A cyan ink base was prepared from the components below, and Cyan Inks 2-1 to 2-4 were prepared by use of the ink base.

(Cyan Ink Base)

| | |
|---|---|
| Glycerin | 7 parts |
| Triethylene glycol | 10 parts |
| Hexylene glycol | 5 parts |
| C.I. Direct Blue 199 | 3 parts |
| Acetylenol EH | 1 part |
| (trade name, Kawaken Fine Chemical K.K.) | |

(Cyan Ink 2-1)

| | |
|---|---|
| Cyan Ink Base above | 26 parts |
| Water | 74 parts |

(Cyan Ink 2-2)

| | |
|---|---|
| Cyan Ink Base above | 26 parts |
| Ammonium sulfate | 2 parts |
| Lithium hydroxide | 0.3 part |
| Water | 71.7 parts |

(Cyan Ink 2-3)

| | |
|---|---|
| Cyan Ink Base above | 26 parts |
| Citric acid | 1 part |
| Diethanolamine | 4 parts |
| Water | 69 parts |

(Cyan Ink 2-4)

| | |
|---|---|
| Cyan Ink Base above | 26 parts |
| Sodium hydrogencarbonate | 1 part |
| Sodium carbonate | 2 parts |
| Water | 71 parts |

A magenta ink base was prepared from the components below, and Magenta Inks 2-1 to 2-4 were prepared by use of the magenta ink base.

(Magenta Ink Base)

| | |
|---|---|
| Triethylene glycol | 10 parts |
| Urea | 10 parts |
| Isopropyl alcohol | 4 parts |
| C.I. Acid Red 94 | 3 part |
| Acetylenol EH | 1 part |
| (trade name, Kawaken Fine Chemical K.K.) | |

(Magenta Ink 2-1)

| | |
|---|---|
| Magenta Ink Base above | 28 parts |
| Water | 72 parts |

(Magenta Ink 2-2)

| | |
|---|---|
| Magenta Ink Base above | 28 parts |
| Ammonium succinate | 1.5 parts |
| Arginine | 3 parts |
| Water | 67.5 parts |

(Magenta Ink 2-3)

| | |
|---|---|
| Magenta Ink Base above | 28 parts |
| Ammonium acetate | 2.5 parts |
| Sodium hydroxide | 0.4 part |
| Water | 69.1 parts |

-continued (Magenta Ink 2-4)

| | |
|---|---|
| Magenta Ink Base above | 28 parts |
| Succinic acid | 1 part |
| Monoisopropanolamine | 4 parts |
| Water | 67 parts |

A yellow ink base from the components below, and Yellow Inks 2-1 to 2-4 were prepared by use of the yellow ink base.

(Yellow Ink Base)

| | |
|---|---|
| Glycerin | 5 parts |
| 2-pyrrolidone | 10 parts |
| Isopropyl alcohol | 4 parts |
| C.I. Acid Yellow 23 | 3 part |
| Acetylenol EH | 1 part |
| (trade name, Kawaken Fine Chemical K.K.) | |

(Yellow Ink 2-1)

| | |
|---|---|
| Yellow Ink Base above | 23 parts |
| Water | 77 parts |

(Yellow Ink 2-2)

| | |
|---|---|
| Yellow Ink Base above | 23 parts |
| Lysine | 3 parts |
| Water | 74 parts |

(Yellow Ink 2-3)

| | |
|---|---|
| Yellow Ink Base above | 23 parts |
| Ammonium acetate | 2 parts |
| Triethanolamine | 6 part |
| Water | 69 parts |

(Yellow Ink 2-4)

| | |
|---|---|
| Yellow Ink Base above | 23 parts |
| Ammonium benzoate | 1.2 parts |
| Ammonia | 0.8 part |
| Water | 75 parts |

Examples 7–12 and Comparative Examples 3 and 4

The ink sets of Examples 7–12 and Comparative Examples 3 and 4 are prepared by combining the above inks as shown in Table 4.

TABLE 4

Combination of Inks for Ink Set

| | Ink No. | | | |
|---|---|---|---|---|
| | Black | Cyan | Magenta | Yellow |
| Example | | | | |
| 7 | 2-1 | 2-2 | 2-2 | 2-2 |
| 8 | 2-1 | 2-3 | 2-3 | 2-3 |
| 9 | 2-1 | 2-4 | 2-4 | 2-4 |
| 10 | 2-2 | 2-2 | 2-2 | 2-2 |
| 11 | 2-2 | 2-3 | 2-3 | 2-3 |
| 12 | 2-2 | 2-4 | 2-4 | 2-4 |
| Comparative Example | | | | |
| 3 | 2-3 | 2-1 | 2-1 | 2-1 |
| 4 | 2-4 | 2-1 | 2-1 | 2-1 |

The buffering capability against change of a hydrogen ion concentration of the color inks employed in the respective ink color sets are examined by measuring the change of pH caused by addition of 1.5 mL of aqueous 1 N sulfuric acid solution to 50 mL of the color ink. Table 5 shows the results. The pH values of Black Inks 2-1 to 2-4 were also shown in Table 5.

TABLE 5 pH and Buffering capability of Inks of Y, M, C, and Bk

| Color | Ink No. | pH of Ink Before sulfuric acid addition | pH of Ink After sulfuric acid addition | Change | Buffering capability |
|---|---|---|---|---|---|
| Y | 2-1 | 6.21 | 2.11 | 4.1 | No |
|   | 2-2 | 9.15 | 8.72 | 0.43 | Yes |
|   | 2-3 | 9.45 | 9.28 | 0.17 | Yes |
|   | 2-4 | 10.13 | 9.8 | 0.33 | Yes |
| M | 2-1 | 6.54 | 2.35 | 4.19 | No |
|   | 2-2 | 9.57 | 9.34 | 0.23 | Yes |
|   | 2-3 | 10.30 | 10.12 | 0.18 | Yes |
|   | 2-4 | 10.41 | 10.31 | 0.1 | Yes |
| C | 2-1 | 7.14 | 1.97 | 5.17 | No |
|   | 2-2 | 10.05 | 9.84 | 0.21 | Yes |
|   | 2-3 | 9.35 | 9.22 | 0.13 | Yes |
|   | 2-4 | 10.12 | 9.94 | 0.18 | Yes |
| Bk | 2-1 | 5.07 | — | — | — |
|   | 2-2 | 5.21 | — | — | — |
|   | 2-3 | 5.43 | — | — | — |
|   | 2-4 | 5.51 | — | — | — |

(Evaluation Method and Evaluation Standard)

An ink-jet recording apparatus BJF 800 (manufactured by Canon Inc.) was employed which has an on-demand type multi-head ejecting ink by applying thermal energy in response to a recording signal. The recording apparatus was modified for the evaluation test. The ink set described above was placed on the modified apparatus, and the printing test was conducted. Two kinds of plain paper sheets were used as the recording medium for the printing test: PB Paper (copying paper, supplied by Canon Inc.) and 4024 Paper (copying paper, supplied by Xerox Co.). Table 6 shows the results.

(Bleeding between Black Ink and Color Inks)

Printing was conducted with the ink set on the above plain paper sheet to form a pattern in which a black solid area printed with the black ink and a solid area printed with the yellow, magenta, or cyan ink are adjacent to each other. The evaluation standard is as indicated below. Table 6 shows the results.

A: Bleeding is not observed visually in all of the boundary.
B: Slight bleeding is observed visually, but is acceptable practically.
C: Bleeding is observed visually.

TABLE 6

| Recording medium | Color | Example 7 | 8 | 9 | 10 | 11 | 12 | Comparative Example 3 | 4 |
|---|---|---|---|---|---|---|---|---|---|
| PB paper | Y | A | A | A | A | A | A | C | C |
|   | M | A | A | A | A | A | A | C | C |
|   | C | A | A | A | A | A | A | C | C |
| 4024 paper | Y | A | A | A | A | A | A | C | C |
|   | M | A | A | A | A | A | A | B | B |
|   | C | A | A | A | A | A | A | B | B |

For testing the abrasion resistance of the printed image, solid print images were formed on the above two kinds of plain paper sheets with the black ink of the ink sets of Examples 7–12 in the same manner as in the above bleeding test. Four hours after the printing, a silbon paper sheet was placed on the printed paper sheet, and a weight of 1 kg having a side of 5 cm was placed. Then the silbon paper sheet was pulled. The non-printed area (white ground) of the recording medium and the silbon paper sheet surface were examined visually for the turbidity caused by the friction between the two paper sheets. As the results, no turbidity was observed both on the white ground of the recording paper sheet and on the surface of the silbon paper.

For testing the marking-pen resistance, characters were printed by use of the ink sets of Examples 7–12 on the above two kinds of plain paper sheets with the above ink-jet recording apparatus. One hour later, the characters were traced once with a fluorescent yellow marking-pen (Spot Writer Yellow, Pilot K.K.) with an ordinary pen pressure. The feathering of the printed area, turbidity in the white background around the characters, and the turbidity at the pen tip portion were observed visually. As the results, neither bleeding nor turbidity was observed. This proves the superiority in the abrasion resistance and the marking-pen resistance of the black ink of the second embodiment of the present invention.

EFFECTS OF THE INVENTION

As described above, the present invention provides an ink set for ink-jet recording containing a black ink which satisfies the print quality, image durability, and other properties, and does not cause bleeding at the boundary between the black color print area and another color print area; and also provides also an ink-jet recording method and an apparatus therefor.

The ink set of the present invention, which comprises a black ink containing a colorant enclosed in a resin, forms an ink-jet recorded image of high quality having excellent abrasion resistance and marking-pen resistance without impairing the reliability of the ink-jet recording ink.

What is claimed is:

1. An ink set for recording a color image with inks of two or more colors comprising at least one black ink and one color ink on a recording medium,
   wherein the black ink contains a self-dispersible carbon black having at least one cationic group bonded directly or through another atomic group to the surface thereof, and the color ink contains an anionic substance and has a buffering capability against a pH change, and
   wherein the pH of the color ink is higher than that of the black ink.

2. The ink set according to claim 1, wherein the black ink further contains a resin encapsulating a colorant.

3. The ink set according to claim 2, wherein the colorant encapsulated in the resin is a water-insoluble dye or a pigment.

4. The ink set according to claim 2, wherein the resin encapsulating the colorant has a cationic hydrophilic group on the surface thereof.

5. The ink set according to claim 2, wherein the colorant encapsulated in the resin has a color substantially the same as the color of the coloring material contained in the black ink.

6. The ink set according to claim 2, wherein the resin encapsulating the colorant has a constitution in which the colorant is enclosed in a microcapsule composed of the resin.

7. The ink set according to claim 1, wherein the pH change of the color ink caused by addition of 1.5 mL of aqueous 1N-sulfuric acid to 50 mL of the color ink is buffered to be not more than 1.0.

8. The ink set according to claim 1, wherein the cationic group on the surface of the self-dispersible carbon black is selected from the group consisting of primary amino, secondary amino, tertiary amino, quaternary ammonium, and quaternary phosphonium.

9. The ink set according to claim 1, wherein the anionic group contained in the color ink is an anionic dye.

10. The ink set according to claim 1, wherein the pH of the black ink is in an acidic range, and the pH of the color ink is in a neutral or basic range.

11. The ink set according to claim 10, wherein the color ink contains at least one of ammonium salts and amine salts of organic or inorganic acids, and has the pH in the basic range.

12. The ink set according to claim 1, wherein the color ink contains at least one compound selected from the group consisting of ammonia and basic amino compounds.

13. The ink set according to claim 1, wherein the ink set is adapted for color ink-jet recording.

14. A method for alleviating bleeding at a boundary between a black color image and a color image each formed on a recording medium by ink-jet method, comprising the steps of:
    forming the black color image with a black ink containing a self-dispersible carbon black having a cationic group bonded directly or through another atomic group to the surface thereof;
    and forming the color image with a color ink containing an anionic substance and having a buffering capability against a pH change,
    wherein the pH of the color ink is greater than that of the black ink.

15. An ink set for recording a color image which may contain a black image adjacent to a color image with inks of two or more colors comprising at least one black ink and one color ink on a recording medium,
    wherein the black ink contains a self-dispersible carbon black having at least one cationic group bonded directly or through another atomic group to the surface thereof, and the color ink contains an anionic substance and has a buffering capability against a pH change, and
    wherein the pH of the color ink is higher than that of the black ink.

16. An ink-jet recording method, comprising the steps of:
    providing an ink according to claim 1 or 15;
    applying the black ink onto a recording medium by ejecting the black ink through an orifice in response to a recording signal; and
    applying the color ink onto the recording medium by ejecting the color ink through another orifice in response to another recording signal.

17. The ink-jet recording method according to claim 16, wherein the ink is ejected by applying thermal energy to the ink.

18. A recording unit comprising a black ink holder holding the black ink of the ink set according to claim 1 or 15, a color ink holder holding the color ink of the ink set according to claim 1 or 15, and a head for ejecting the black ink and the color ink.

19. The recording unit according to claim 18, wherein the head ejects a droplet of ink by applying thermal energy to the ink.

20. The recording unit according to claim 18, wherein the ink holder is formed of a polyurethane resin, a cellulose resin, a polyvinyl acetate resin, or a polyolefin resin.

21. An ink cartridge comprising a black ink holder holding the black ink of the ink set according to claim 1 or 15, and a color ink holder holding the color ink of the ink set according to claim 1 or 15.

22. The ink cartridge according to claim 21, wherein the ink holder has an ink-contacting face formed of a polyolefin resin.

23. An ink-jet recording apparatus comprising a black ink holder holding the black ink of the ink set according to claim 1 or 15, a color ink holder holding the color ink of the ink set according to claim 1 or 15, and a head for ejecting the black ink and the color ink.

24. The ink-jet recording apparatus according to claim 23, wherein the head ejects a droplet of ink by applying thermal energy to the ink.

25. The ink-jet recording apparatus according to claim 24, wherein the ink holder is formed of a polyurethane resin, a cellulose resin, a polyvinyl acetate resin, or a polyolefin resin.

* * * * *